(12) United States Patent
Soffer

(10) Patent No.: US 11,675,407 B2
(45) Date of Patent: Jun. 13, 2023

(54) SMARTPHONE AND ADD-ON DEVICE POWER DELIVERY SYSTEM

(71) Applicant: HIGH SEC LABS LTD., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 0 days.

(21) Appl. No.: 17/767,065

(22) PCT Filed: Feb. 2, 2021

(86) PCT No.: PCT/IL2021/050116
§ 371 (c)(1),
(2) Date: Apr. 7, 2022

(87) PCT Pub. No.: WO2021/165952
PCT Pub. Date: Aug. 26, 2021

(65) Prior Publication Data
US 2022/0350389 A1    Nov. 3, 2022

(30) Foreign Application Priority Data

Feb. 20, 2020    (IL) ......................................... 272832

(51) Int. Cl.
*G06F 1/26*    (2006.01)
(52) U.S. Cl.
CPC .............. *G06F 1/266* (2013.01); *G06F 1/263* (2013.01)
(58) Field of Classification Search
CPC ..................................... G06F 1/32; G06F 1/26
See application file for complete search history.

(56) References Cited

U.S. PATENT DOCUMENTS

| 7,603,139 B1 | 10/2009 | Tom |
| 7,673,338 B1 | 3/2010 | Osburn et al. |

(Continued)

FOREIGN PATENT DOCUMENTS

| EP | 2448216 | 5/2012 |
| WO | 2014107582 A1 | 7/2014 |
| WO | 2019097511 A1 | 5/2019 |

*Primary Examiner* — Phil K Nguyen
(74) *Attorney, Agent, or Firm* — Alphapatent Associates, Ltd; Daniel J. Swirsky

(57) ABSTRACT

A system incorporating a smartphone comprising a smartphone and add-on device coupled to each other via combined data/power interface, wherein the smartphone comprises a rechargeable battery connected to battery protection circuitry and the add-on device optionally comprises a rechargeable battery connected to battery protection circuitry as well, the combined data/power interface comprises: one or more data pins for transferring data between the smartphone and the add-on device; one or more regulated power delivery pins; and one or more protected-battery power delivery pins, wherein the regulated power delivery pins are used to charge the battery of the smartphone from an external charger coupled to the add-on device, the batteries are connected to the battery protection circuitries that is configured to protect the battery by cutoff or limit the current or voltage on the battery electrodes, the protected-battery power delivery pins are connected to the battery protection circuitries of the smartphone or add-on device. The following power delivery paths are enabled: (1) the add-on device is powered by the battery of the smartphone through the protected-battery power delivery pins that are connected to the output of the battery protection circuitry of the smartphone. (2) the smartphone is powered by the battery of the add-on device through the protected-battery power delivery pins that are connected to the output of the battery protection circuitry of the add-on device, and (3) the (Continued)

batteries charge each other through the protected-battery power delivery pins that are connected to the output of the battery protection circuitries of smartphone and add-on devices.

41 Claims, 9 Drawing Sheets

(56) References Cited

U.S. PATENT DOCUMENTS

| | | | |
|---|---|---|---|
| 8,237,414 B1 * | 8/2012 | Li | H02J 7/00047 |
| | | | 320/160 |
| 9,887,571 B1 | 2/2018 | Sultenfuss et al. | |
| 10,747,284 B2 | 8/2020 | Koki et al. | |
| 2002/0187808 A1 | 12/2002 | Wallstrom et al. | |
| 2003/0068034 A1 | 4/2003 | Silvester | |
| 2014/0065948 A1 | 3/2014 | Huang | |
| 2014/0191033 A1 | 12/2014 | Wojcik et al. | |
| 2015/0248151 A1 * | 9/2015 | Lim | G06F 13/10 |
| | | | 713/310 |
| 2015/0270733 A1 * | 9/2015 | Inha | H02J 7/342 |
| | | | 320/103 |
| 2015/0301552 A1 * | 10/2015 | Lim | H02J 7/00 |
| | | | 374/152 |
| 2016/0139640 A1 * | 5/2016 | Hijazi | G06F 1/26 |
| | | | 29/857 |
| 2017/0090530 A1 * | 3/2017 | Filser | H02J 1/084 |

* cited by examiner

SMARTPHONE AND ADD-ON DEVICE POWER DELIVERY SYSTEM

FIELD AND BACKGROUND OF THE INVENTION

The present invention, in some embodiments thereof, relates to smartphones and, more particularly, but not exclusively, to power delivery between smartphone and add-ons devices or peripheral devices.

Modern mobile phones or other similar mobile communication devices, computing devices or, in general, portable electronic devices, hereinafter smartphones, may support various peripheral devices. The peripheral devices may be coupled to the smartphone using short range wireless communication or coupled through conductive connections. Typically, in smartphones, there is a single point of connection through a standard receptacle connector contains both data and power pins, hereinafter, a combined data/power interface. One popular combined data/power interface today is the USB standard interface. The peripheral devices may have their own independent power source (e.g. battery) or may be powered by the smartphone internal battery. The combined data/power interface typically enables charging of the smartphone internal rechargeable battery. The combined data/power interface connecting between the smartphone and the peripheral device may also be used to charge a rechargeable battery of the peripheral device by the smartphone and vice versa, i.e., charge the smartphone rechargeable battery by the peripheral device. Charging both the smartphone and the peripheral device may be done from an external battery charger connected to the grid.

The amount of power consumed by a peripheral device may vary. Some peripheral devices, such as, portable hard disks, portable medical Ultra-Sound (US) or X-Ray imager, secure add-ons for encrypted communication devices, and the like, may have a considerable power consumption. A critical parameter of a combined system, where the smartphone powers a peripheral device having a considerable power consumption, is the smartphone battery endurance. Therefore, an objective of the present invention, is to increase the power chain efficiency in both the smartphone and the connected peripheral device to assure maximum endurance (i.e., long use time between consecutive chargings).

An example of an up-to-date art with an effort to provide efficient power delivery over a combined data/power interface USB standard comprising USB type-C connector is presented in U.S. Pat. No. 9,887,571, entitled "COMBINING POWER FROM AN INTERNAL BATTERY AND AN EXTERNAL POWER STORAGE ADAPTER", by Sultenfuss et al., issued on Feb. 6, 2018. Another such example can be found in U.S. patent application Ser. No. 15/937,603, entitled "Supplemental power reception by bypassing voltage regulator" by Koki et al., filed on Mar. 27, 2018.

SUMMARY OF THE INVENTION

The present invention, in some embodiments thereof, relates to smartphones and, more particularly, but not exclusively, to power delivery between smartphone and add-ons devices or peripheral devices.

The invention is teaching methods to design or modify smartphones and peripheral devices, in order to support higher efficiency power transfer in a system of a smartphone and peripheral device that are connected through combined data/power interface peripheral device. According to an aspect of some embodiments of the present invention there is provided direct delivery of power from the battery through battery protection circuitry to the combined data/power interface.

According to an aspect of some embodiments of the present invention there is provided a system incorporating a smartphone comprising: a smartphone comprising a rechargeable battery, a battery protection circuitry, and a combined data/power interface; and an add-on device configured to be coupled to the smartphone combined data/power interface, wherein the combined data/power interface comprises: one or more data pins for transferring data between the smartphone and the add-on device one or more regulated power delivery pins; and one or more protected-battery power delivery pins, and wherein the regulated power delivery pins are used to charge the battery of the smartphone from an external charger when coupled to the add-on device, the battery is connected to the battery protection circuitry that is configured to protect the battery by cutoff or limit the current or voltage on the battery electrodes, the protected-battery power delivery pins are connected to the battery protection circuitry of the smartphone, and the add-on device is powered using a protected-battery power delivery mode by the battery of the smartphone through the protected-battery power delivery pins.

According to some embodiments of the invention, the combined data/power interface is USB.

According to some embodiments of the invention, the combined data/power interface comprises USB type-C connector.

According to some embodiments of the invention, the one or more protected-battery power delivery pins are usable as data pins or regulated power delivery pins in times they are not used as protected-battery power delivery pins.

According to some embodiments of the invention, the battery is any one of (1) lithium-ion (Li-ion) battery, (2) lithium-ion polymer (Li-ion polymer) battery, (3) nickel-metal hydride (NiMH) battery, and nickel-cadmium (NiCd) battery.

According to some embodiments of the invention, the battery is removable and the battery protection circuitry reside inside the removable battery enclosure.

According to some embodiments of the invention, the battery protection circuitry performs any one of or a combination of (1) cutoff the current between the battery electrodes, (2) limit the current between the battery electrodes, and (3) limit the voltage between the battery electrodes.

According to some embodiments of the invention, the battery protection circuitry senses any one of or a combination of (1) battery current, (2) battery voltage, and (3) battery temperature.

According to some embodiments of the invention, the add-on device is any one of (1) storage device, (2) communication device, (3) encryption device, and (4) portable medical imaging device.

According to some embodiments of the invention, the combined data/power interface further comprises negotiation pins that are used to establish communication between the smartphone and the add-on in order to configure the combined data/power interface.

According to some embodiments of the invention, the protected-battery power delivery is conditioned upon negotiation between the smartphone and the add-on device.

According to some embodiments of the invention, the system is configured to couple a plurality of add-on devices by chaining add-on devices one to each other over a chain of combined data/power interfaces.

According to some embodiments of the invention, protected-battery power delivery pins are pins that when not used by the combined data/power interface as protected-battery power delivery pins are usable as data pins or regulated power delivery pins.

According to some embodiments of the invention, some pins of combined data/power interface are configured to be dynamically switched between usage as regulated power delivery pins and usage as protected-battery power delivery pins.

According to some embodiments of the invention, the smartphone is a modified off-the-shelf smartphone and the modification provides support for protected-battery power delivery mode.

According to some embodiments of the invention, the smartphone and the add-on device are configured to switch the power delivery mode of one or more pins of combined data/power interface between regulated power delivery and protected-battery power delivery.

According to some embodiments of the invention, the smartphone and the add-on device are configured to switch the direction of power delivery of one or more pins of combined data/power interface between power flow from the smartphone to the add-on device and power flow from the add-on device to the smartphone.

According to some embodiments of the invention, the smartphone is running operating system that is any one of (1) Android, (2) iOS, (4) Windows Phones, (5) Windows Mobile, and Chrome OS.

According to some embodiments of the invention, the smartphone is any one of (1) cellular phone, (2) laptop, (3) tablet, (4) Personal Digital Assistant (PDA), (5) communication terminal, (6) portable media player or (7) portable, battery powered, electronic device.

According to an aspect of some embodiments of the present invention there is provided a smartphone powering add-one devices comprising: a battery; a battery protection circuitry; and a combined data/power interface; wherein the smartphone is configured to be attached to an add-on device using the combined data/power interface, the battery is connected to the battery protection circuitry that is configured to protect the battery by cutoff or limit the current or voltage on the battery electrodes, the combined data/power interface comprises: one or more data pins configured to transferring data between the smartphone and the add-on device; one or more regulated power delivery pins; and one or more protected-battery power delivery pins, and wherein the regulated power delivery pins are used to charge the battery of the smartphone from an external charger, and the protected-battery power delivery pins are connected to the battery protection circuitry of the smartphone, and are configured to power the add-on device using a protected-battery power delivery mode by the battery of the smartphone through this protected-battery power delivery pins.

According to some embodiments of the invention, the combined data/power interface is USB.

According to some embodiments of the invention, the combined data/power interface comprises USB type-C connectors.

According to some embodiments of the invention, the one or more protected-battery power delivery pins are used as data pins or regulated power delivery pins in times they are not used as protected-battery power delivery pins.

According to some embodiments of the invention, the battery is any one of (1) lithium-ion (Li-ion) battery, (2) lithium-ion polymer (Li-ion polymer) battery, (3) nickel-metal hydride (NiMH) battery, and nickel-cadmium (NiCd) battery.

According to some embodiments of the invention, the battery is removable and the battery protection circuitry reside inside the removable battery enclosure.

According to some embodiments of the invention, the battery protection circuitry performs any one of or a combination of (1) cutoff the current between the battery electrodes, (2) limit the current between the battery electrodes, and (3) limit the voltage between the battery electrodes.

According to some embodiments of the invention, the battery protection circuitry senses any one of or a combination of (1) battery current, (2) battery voltage, and (3) battery temperature.

According to some embodiments of the invention, the combined data/power interface further comprises negotiation pins that are used to establish communication between the smartphone and the add-on in order to configure the combined data/power interface.

According to some embodiments of the invention, the protected-battery power delivery is started conditioned upon negotiation between the smartphone and the add-on device.

According to some embodiments of the invention, the protected-battery power delivery pins are pins that when not used by the combined data/power interface as protected-battery power delivery pins are used as data pins or regulated power delivery pins.

According to some embodiments of the invention, some pins of combined data/power interface are configured to be dynamically switched between usage as regulated power delivery pins and usage as protected-battery power delivery pins.

According to some embodiments of the invention, the smartphone is a modified off-the-shelf smartphone and the modification provides support for using protected-battery power delivery mode.

According to some embodiments of the invention, the smartphone is able to switch the power delivery mode of one or more pins of combined data/power interface between regulated power delivery and protected-battery power delivery.

According to some embodiments of the invention, the smartphone and the add-on device are able to switch the direction of power delivery of one or more pins of combined data/power interface between power flow from the smartphone to the add-on device and power flow from the add-on device to the smartphone.

According to some embodiments of the invention, the smartphone is running operating system that is any one of (1) Android, (2) iOS, (4) Windows Phones, (5) Windows Mobile, and Chrome OS.

According to some embodiments of the invention, the smartphone is any one of (1) cellular phone, (2) laptop, (3) tablet, (4) Personal Digital Assistant (PDA), (5) communication terminal, (6) portable media player or (7) portable, battery powered, electronic device.

According to an aspect of some embodiments of the present invention there is provided an add-on device for a smartphone comprising a combined data/power interface comprising: one or more data pins configured to transferring data between the add-on device and the smartphone; one or more regulated power delivery pins; and one or more protected-battery power delivery pins, wherein the add-on device is configured to be attached to a smartphone using the combined data/power interface, the regulated power delivery pins are used to charge the battery of the smartphone from an external charger coupled to the add-on device, and the protected-battery power delivery pins are configured to be used to power the add-on device wherein this pins are configured to be directly connected to the battery protection circuitry of the smartphone and the battery protection circuitry is connected to the battery of the smartphone.

According to an aspect of some embodiments of the present invention there is provided a method for modification of an off-the-shelf smartphone comprising: a battery; a battery protection circuitry; and a combined data/power interface; wherein the battery is connected to the battery protection circuitry, the combined data/power interface comprises a connector, the connector comprises one or more newly assigned protected-battery power delivery pins, and wherein the method of modification comprising the step of connecting the one or more newly assigned protected-battery power delivery pins to the power port of the battery protection circuitry.

According to some embodiments of the invention, the method is further comprising disconnecting the one or more newly assigned protected-battery power delivery pins from their legacy connection.

According to some embodiments of the invention, combined data/power interface is USB and the connector of the combined data/power interface is USB Type-C connector.

According to some embodiments of the invention, the newly assigned protected-battery power delivery pins that after the modification are connected to the battery protection circuitry are one or more out of the eight high speed data transfer pins: A2, A3, A10, A11, B2, B3, B10 and B11 of USB type-C connector.

According to some embodiments of the invention, the newly assigned protected-battery power delivery pins that after modification are connected to the battery protection circuitry are one or more out of the two side band use pins: A8 and B8 of USB type-C connector.

According to an aspect of some embodiments of the present invention there is provided a combined data/power interface for a smartphone comprising: one or more data pins; one or more regulated power delivery pins; and one or more protected-battery power delivery pins, wherein the one or more data pins are used for transferring data between the smartphone and the add-on device, the regulated power delivery pins are used to charging the smartphone and powering add-on devices from the battery of the smartphone after passing through battery protection circuitry and voltage conversion and regulation circuitry, and the protected-battery power delivery pins are used to powering add-on devices from the battery of the smartphone after passing through only battery protection circuitry.

According to an aspect of some embodiments of the present invention there is provided a system incorporating a smartphone comprising: a smartphone comprising a rechargeable battery, a battery protection circuitry, and a combined data/power interface; and an add-on device comprising a rechargeable battery, a battery protection circuitry, and a combined data/power interface wherein the add-on device is configured to be coupled to the smartphone using the combined data/power interface, wherein the combined data/power interface comprises: one or more data pins for transferring data between the smartphone and the add-on device one or more protected-battery power delivery pins, and wherein the battery of the smartphone is connected to the battery protection circuitry of the smartphone that is configured to protect the battery of the smartphone by cutoff or limit the current or voltage on the battery electrodes of the smartphone, the battery of the add-on device is connected to the battery protection circuitry of the add-on device that is configured to protect the battery of the add-on device by cutoff or limit the current or voltage on the battery electrodes of the add-on device, the protected-battery power delivery pins are connected both to the battery protection circuitry of the smartphone and the battery protection circuitry of the add-on device, and wherein conditioned upon negotiation between the smartphone and add-on devices either the battery of the add-on charges the battery of the smartphone or the battery of the smartphone charges the battery of add-on device through the protected-battery power delivery pins.

According to some embodiments of the invention, from time to time the smart phone or the add-on device send monitoring messages comprise battery state and charging state information.

According to an aspect of some embodiments of the present invention there is provided an add-on device for a smartphone comprising: a rechargeable battery; a battery protection circuitry; and a combined data/power interface; and the combined data/power interface comprises: one or more data pins configured to transferring data between the add-on device and the smartphone; one or more regulated power delivery pins; and one or more protected-battery power delivery pins, wherein the add-on device is configured to be attached to a smartphone using the combined data/power interface, the protected-battery power delivery pins are connected to the battery protection circuitry of the add-on device and the battery protection circuitry is connected to the battery of the add-on device, the regulated power delivery pins are used to charge the battery of the smartphone through an internal charger of the smartphone using a regulated voltage, and the protected-battery power delivery pins are used to charge the battery of the smartphone through direct connection from the add-on device battery protection circuitry to the smartphone battery.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a processor, such as a micro-controller for executing a plurality of instructions. Optionally, the processor includes a volatile memory for storing instructions and/or data and/or a nonvolatile storage, for example, a hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
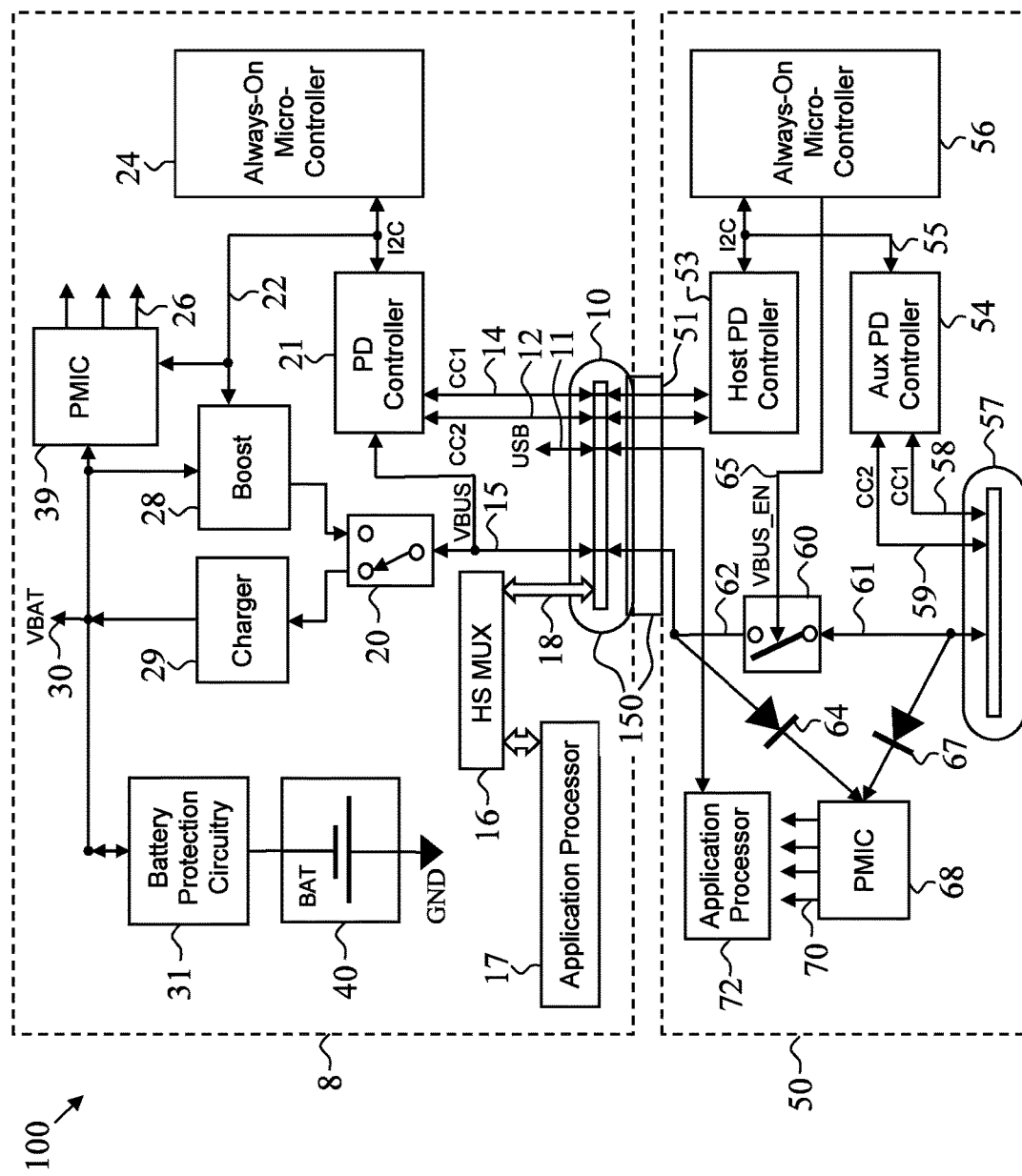
FIG. 1 is a high-level block diagram presenting of a prior art smartphone with add-on peripheral device system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF SPECIFIC EMBODIMENTS OF THE INVENTION

The present invention, in some embodiments thereof, relates to smartphones and, more particularly, but not exclusively, to power delivery between smartphone and add-ons devices or peripheral devices.

Modern mobile phones or other similar mobile communication devices, computing devices or, in general, electronic devices, hereinafter smartphones, may support various peripheral devices. The peripheral devices may be coupled to the smartphone through conductive connections, i.e., wired connection, or via short range wireless communication. The current invention is related to a single point of connection through a conductive connection using a single connector that contains both data and power pins, hereinafter, a combined data/power interface, that transfers data and delivers power between the smartphone and the add-on device. One popular combined data/power interface for smartphones today is the USB standard interface. The peripheral devices may have their own independent power source (e.g. battery) or may be powered from the smartphone internal battery. The combined data/power interface typically enables charging of the smartphone internal rechargeable battery. The combined data/power interface connecting between the smartphone and the peripheral device may also be used to charge a rechargeable battery of the peripheral device from the smartphone and vice versa, i.e., charge the smartphone rechargeable battery from the peripheral device. Charging both the smartphone and the peripheral device may be done from an external battery charger connected to the grid.

The amount of power consumed by a peripheral device may vary. Some peripheral devices, such as, portable hard disks, portable medical Ultra-Sound (US) or X-Ray imager, secure add-ons for encrypted communication devices and the like, may have a considerable power consumption. A critical parameter of a combined system, where the smartphone powers the peripheral, and the peripheral having a considerable power consumption, is the smartphone battery endurance. Therefore, an objective of the present invention, is to increase the power chain efficiency in both the smartphone and the connected peripheral device to assure maximum endurance (i.e., long use time between consecutive chargings). In some case, the add-on device comprises internal rechargeable battery that may also deliver power to the smartphone. In other cases, the add-on device is just a portable power pack that deliver power to the smart phone to increase smartphone use time.

As used herein, the terms "smartphone", "mobile electronic device" and "portable electronic device" means any mobile or portable electronic device, such as, telephony-centric, like mobile phone, smart-phone, cell-phone, cellular phone, computing-centric, such as laptop computer, notebook computer, tablet or Personal Digital Assistant (PDA), data communication centric, such as, mobile terminal, portable media players/displays and any other similar portable, battery powered, electronic device. the terms "smartphone", "mobile electronic device" "portable electronic device" and are alternately used in this application with respect to the specific section context. With respect to the invention these terms essentially mean the same and are used alternatively.

As used herein, the terms "peripheral device" and "add-on device" means any mobile or portable device that is connected, attached or coupled to the smartphone to perform extended functionality such as but not limited to, access or save external data, communicate through alternative communication channels, encrypt or decrypt data, provide additional input or output user interface, provide additional sensing and computing capabilities, for example, portable medical imaging, provide additional power, such as, portable power packs (also known as external batteries or external chargers), or the like. Popular alternative names to "peripheral device" when the smartphone is inserted into the peripheral device or wrapped partially or fully by the peripheral device is jacket or sleeve. The terms "peripheral device" and "add-on device" are alternately used in this application with respect to the specific section context. With respect to the present invention the terms essentially mean the same.

As used herein, the term "combined data/power interface" means matched ports or connectors, one on the smartphone side and the other in the add-on device side, comprising a plurality of electrically conducting elements, e.g., pins, that connect between the smartphone and add-on device. The combined data/power interface provides both power delivery and data transfer between the smartphone and add-on device. The combined data/power interface comprises elements such as connectors, ports, receptacle, plugs, matched male and female arrangements, pins and cables. The combined data/power interface, optionally, also defines data and handshaking protocols and compliance to standards. An example, for a popular combined data/power interface used in smartphones is Universal Serial Bus (USB). USB is a family of interfaces includes several versions of the standard such as USB 1.0, USB 2.0, USB 3.0, USB 3.1 and USB3.2. the USB interface defines several connectors (plugs and receptacles) including Type A, type B, mini type A and mini type B, micro types A and micro types B, and type C. Other combined data/power interface, such as Thunderbolt™, mobile high-definition link (MHL), Peripheral Component Interconnect Express (PCIe), FireWire, HDMI, and the like, may be used in mobile electronic devices. As for today, the up-to-date combined data/power interface is USB 3.X with USB Type-C, 24-pin connector. In exemplary embodiments of the invention, USB 3.X with USB Type-C connectors are used to demonstrate the invention with an exemplary specific combined data/power interface. When using this term in this document, the term is referred either to only one side of the interface, e.g., a single connector, when, in the context, the term refers to only a smartphone or only a peripheral device, or to both sides of the interface, when, in the context, the term refers to the whole system. Although some of the embodiments in this invention has been described in conjunction with a specific combined data/power interface, it is evident that other alternatives interfaces standards as well as newer or older variations of the USB standard will be apparent, with the essential modification, to those skilled in the art.

As used herein, the term "connected" means a direct connection, such as electrical, or mechanical connection between the things that are connected, without any intermediary components or devices. In case of electrical connection, the term connected may also be used for a connection through cables, connectors, wires, PCB traces, pins, switches or any other low ohmic resistance element that is used to establish galvanic connection between the things.

As used herein, the term "coupled" or "attached" means a direct or indirect connection, such as a direct electrical or mechanical connection between the things that are connected or an indirect connection, through one or more passive or active intermediary components or devices.

As used herein, the term "circuitry" means one or more passive and/or active components that are arranged to cooperate with one another to provide a desired one or more functions.

In cases where a peripheral device is powered through the combined data/power interface (e.g., using USB Type-C connector) the interface typically functions both as wired charging port (to charge the smartphone battery) and as a power source to power the peripheral devices. When the peripheral device is drawing power from the smartphone battery through the combined data/power interface it must convert the voltage supplied by the smartphone battery to a standard voltage defined in combined data/power interface standard or specification. For example, in USB Type-C standard, the voltage defined by the standard is +5 volts. The nominal voltage of battery in a typical smartphone today is in the range between +3.2 volts to +4.4 volts. Boost power converters are used in order to increase the battery voltage to the USB Type-C standard voltage of +5 volts. The use of boost converter in the smartphone generates both heat and power loss hence the conversions are having a typical loss of 5%-30% of the converted energy.

To complete the picture, the coupled peripheral device converts back the supplied voltage to a lower voltage typically needed for the peripheral device circuitry. This conversion is typically performed using buck converters that again having their typical energy loss of 5%-30%. Overall the voltage up conversion together with the voltage down conversion may dissipate 10% to 60% of the peripheral consumed energy as heat. As a result, the battery endurance may be much lower than the theoretical battery endurance due to these undesired voltage conversions.

Another problem occurs in the smartphone with the add-on device combination is that the power supplied to the coupled peripheral device may be turned off and on by the smartphone. Some peripheral devices must have a continuous power supply and therefore this type of discontinuous power source may impair the peripheral device functionality. In accordance with the above description, the following are goals of the present invention to:

1. allow direct power flow between the smartphone battery and the combined data/power interface (without using voltage up or down conversions).
2. allow a peripheral device that is capable to operate directly from the smartphone battery voltage to do so (without the voltage conversions).
3. ensure that in embodiments incorporating the invention, the smartphone battery will still be protected from damages and that overheating, overvoltage reverse flow and other safety issues will be prevented.
4. ensure that with a smartphone incorporating the invention, a peripheral device not incorporating the invention would be able to function normally.
5. ensure that with a smartphone incorporating the invention, the peripheral device that incorporates the invention will get a continuous power supply unrelated to the power supply state or mode, e.g., battery save mode, of the smartphone.
6. allow direct power flow between add-ons that contain an internal battery and configured to deliver power to the smartphone without using voltage up or down conversions.

As used herein, the term "rechargeable battery" or, in brief, "battery" means any power source of portable electronic device that can be recharged such as lithium-ion (Li-ion) battery, lithium-ion polymer (Li-ion polymer) battery, nickel-metal hydride (NiMH) battery, nickel-cadmium (NiCd) battery, lead-acid battery, graphene battery, supercapacitor, Zinc-air battery, Aluminum-air battery, Carbon-ion battery, Sodium-ion battery, redox flow battery, or the like. The battery may include one or more cells having a particular chemistry in a particular cell configuration. For example, the battery may include eight Lithium-ion cells in a four parallel-two serial cell configuration.

Figure 2:
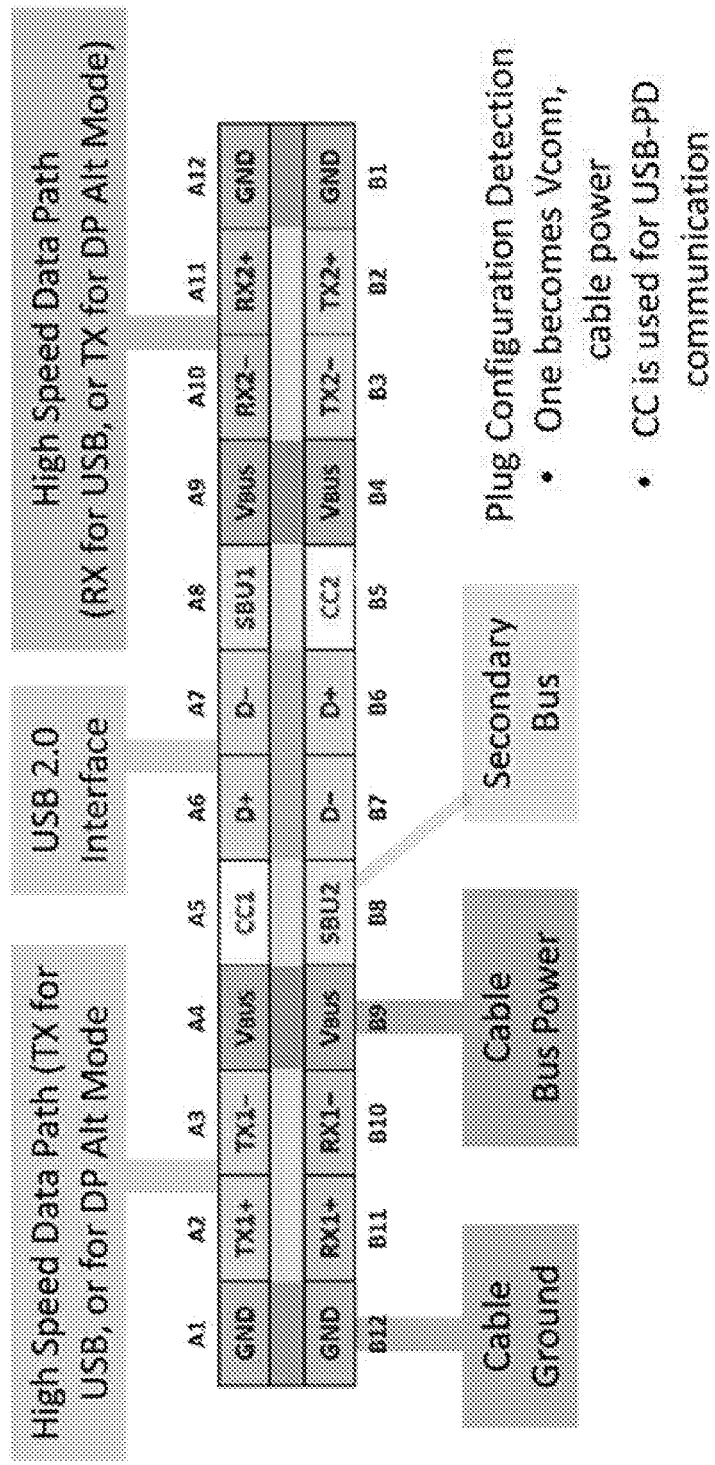
FIG. 2 is a illustrate USB Type-C connector pinout used in the system shown in FIG. 1.

For purposes of better understanding some embodiments of the present invention, as illustrated in FIGS. 3-6 of the drawings, reference is first made to FIGS. 1 and 2. FIG. 1 is a high-level block diagram of a system of smartphone and add-on in the present art.

Prior Art System Comprising Smartphone with Add-on Device

FIG. 1 illustrates a high-level block diagram presenting of a prior art system 100 having smartphone 8 and peripheral device 50 that is being powered by smartphone 8. As stated above, smartphone 8 may be a mobile phone, tablet, portable computer or any other battery powered electronic device. The smartphone comprises combined data/power interface 150. In this exemplary system, smartphone 8 combined data/power interface 150 complies with industry standard USB 3.0 or higher. Smartphone 8 have USB Type-C connector 10. Peripheral device 50 have a mating USB Type-C connector 51. Combined data/power interface 150 enables charging of smartphone 8 from external charger as well as transfer data from smartphone 8 to peripheral device 50 and vice versa.

Prior Art Smartphone

Smartphone 8 power source is a rechargeable battery 40. This battery is typically single or multiple Lithium Polymer or Lithium Ion cells. Battery 40 voltage depends on the cell's chemistry and on the number of cells connected in series. Voltage of +4.4 Volt for fully charged battery and +3.3 Volt for fully discharged battery is delivered by the battery typically. Battery protection circuitry 31, optionally attached to the battery body, protects the battery from dangerous conditions such as over-temperature, short-circuit, over-current, low voltage or the like. The power output of the battery protection circuitry 31 is driving an internal power bus 30 that is typically designated as VBAT. VBAT bus is connected to smartphone 8 Power Management Integrated Circuit (PMIC) 39 that generates and manages the various device voltages such as power line 26.

Always-on low-power microcontroller 24 manages the power supplies, the battery and other critical services. This microcontroller typically drives serial I²C (synchronous, multi-master, multi-slave, packet switched, single-ended, serial computer bus) 22 that enables microcontroller 24 to monitor and manage PMIC 39 as well as other components in smartphone 8. PD (Power Delivery) controller 21 is a circuitry, typically, an Integrated Circuit (IC) that negotiates the power delivery mode of the USB interface. PD controller 21 is connected the CC lines of the standard: CC1 14 and CC2 12 that are coupled to a USB Type-C connector 10. Connector 10 is an exemplary embodiment of combined data/power interface 150 that enables data transfer and power delivery between smartphone 8 and peripheral device 50. Connector 10 pin details are provided in FIG. 2.

PD Controller 21 is typically managed by the Always-on low-power microcontroller 24 through I²C bus 22. PD Controller 21 allows smartphone 8 to identify and negotiate the power and data schemes of the peripheral device 50. PD Controller 21 is further connected to power bus, VBUS, 15 to detect the voltage on bus 15 during different power phases. The legacy USB 2.0 lines 11 of connector 10 are typically coupled to the smartphone application processor 17. The eight high-speed pins 18 of USB type-C connector 10 are typically coupled to high-speed data multiplexer 16 that is further coupled to the application processor 17 to route various data and video functions.

VBUS power switch 20 is typically constructed from one or more Field Effect Transistors (FET) that route the VBUS power bus 15. This switch may be controlled through discrete signals or through the I²C bus 21 by the Always-on low-power microcontroller 24. When smartphone 8 is coupled to the charger through the USB Type-C connector 10, the VBUS power switch 20 positioned to the left to route the power directly to a battery charger 29. Battery charger 29 implements software defined charging scheme that takes into account the supplied current, the supplied voltage, the temperature, the battery state, etc. Battery charger 29 is coupled to the battery through VBAT bus 30. When an external charger is disconnected from USB Type-C connector 10, the voltage at power bus, VBUS, 15 drops. This voltage drop is detected by PD controller 21 that monitors the bus state. This voltage drop event is transmitted to the Always-on low-power microcontroller 24 that in turn change VBUS power switch 20 position to the right state. In that position, power bus, VBUS, 15 is powered by a boost converter 28. Boost converter 28 converts the VBAT power 30 into stabilized +5 volts that is required for the USB Type-C applications.

When smartphone 8 powers connector 10, any peripheral device that will be connected to it, will be able to consume pre-defined current from the device battery 40. Power availability may be controlled by application software running on that smartphone 8. For example, if smartphone 8 is turned off, the Always-on low-power microcontroller 24 may turn off all external power to conserve battery by shutting down the boost converter 28 through I²C bus 22.

Prior Art Add-on Device

Prior-art peripheral device 50 may be permanently attached to smartphone 8 or temporarily attached to smartphone 8. Smartphone 8 provides power source for peripheral device 50 normal operation. Power to peripheral device 50 is provided from the smartphone's battery 40 that powers both smartphone 8 and peripheral device 50. Peripheral device 50 in this example of prior-art device is coupled to the USB 2.0 data pins 11 to provide serial communications between smartphone 8 application processor 17 and the peripheral device 50 application processor 72. Peripheral device 50 is coupled to smartphone 8 USB Type-C connector 10 through mating connector 51. In this case, mating connector 51 is USB Type-C plug. Connector 51 is an exemplary embodiment of combined data/power interface 150 that enables data transfer and power delivery between smartphone 8 and peripheral device 50.

CC1 line 14 and CC2 line 12 of the USB Type-C connector 10 and mating connector 51 are coupled to a Host PD Controller 53 of peripheral device 50. This Host PD Controller 53 is coupled through an I2C bus 55 to Always-On Micro-controller 56 of peripheral device 50. Always-On Micro-controller 56 interact with PD Controller 21 of smartphone 8 through the CC lines 14 and 12 of the USB Type-C connectors 10, 51. This interaction provides power negotiation and set VBUS 15 to power the peripheral device 50.

VBUS 15 is coupled from connector 10, to the mating connector 51 and to VBUS lines 62 in peripheral device 50. Diode 64 delivers the power to a local circuitry through PMIC 68 that convert the incoming USB Type-C +5 volts, VBUS, into one or more lower or higher voltages. PMIC 68 may have multiple LDOs (Low Drop-Out Regulators), Buck converters and boost converters as required for local power consumers located in the peripheral device 50. Another diode 67 is coupled to USB Type-C connector 57 of peripheral device 50. Connector 57 is used for charging the combined system 100 and to enable communication with the application processor 72 through USB interface (not shown in the figure). When a USB Type-C charger is connected to the USB Type-C connector 57, a power line, VBUS 61, is being powered from connector 57. This voltage is being detected by Always-On Microcontroller 56 to initiate the negotiation required between Host PD Controller 53 and PD Controller 21. Once this negotiation completed successfully, VBUS Switch 60 is closed by the Always-on Microcontroller 56 be asserting line VBUS EN 65. Alternatively, VBUS Switch 60 is controlled by I2C bus 55. When VBUS Switch 60 is closed, power from the connected power-supply is flowing through the mating connector 51 to smartphone 8 battery charger 29 to charge battery 40. Diode 67 provides power to PMIC 68 when system 100 is being charged or during transitions when parts of smartphone 8 VBUS bus 15 is turned off.

Aux PD Controller 54 is coupled to Always-On Microcontroller 56 through the I2C bus 55 to enable power and data negotiation with the external device connected to USB Type-C connector 57. Interaction is performed through lines CC1 58 and CC2 59. Prior-art system 100 have the following disadvantages:

Power efficiency is not optimal as significant power is being lost in the boost converter 28 and in the PMIC 68 when powered by +5 volts. System battery 40 will last shorter time when powering peripheral device 50 even if smartphone 8 is being modified (components being removed to save power).

Unless local battery will be installed in peripheral device 50, power to the application processor 72 will be interrupted whenever smartphone 8 is turned off or during power transitions (for example—when charger is removed). Some application processors may be very sensitive for such interruptions.

It should be noted that in the block diagram of FIG. 1 certain protection components are not shown to avoid cluttering. Typical smartphone will have multiple over-voltage, over-current, in-rush current and other protection devices coupled to the external interface lines. Components such as Transient Voltage Suppressor (TVS), capacitors, varistor, clamping diodes, avalanche diodes and Zener diodes are in common use.

Reference is made now to FIG. 2. FIG. 2 illustrates USB Type-C connector pinout. The USB Type-C connector contains 24 pins arrange in two rows A and B. The right-side pins, A12 and B1 and the left-side pins A1, B12 are used for ground. The center pins A6, A7, B6 and B7 are used for legacy USB 2.0 data transfer. Eight pins, A2, A3, A10, A11, B2, B3, B10 and B11 are used for high speed data transfer. Four pins A4, A9, B4 and B9 are used for the USB bus power delivery and are designated as VBUS pins. VBUS nominal voltage is +5 volts. Pins A5 (CC1) and B5 (CC2) are Configuration Channel (CC) pins and are used for configuration and power delivery negotiation. Pins A8 (SBU1) and B8 (SBU2) are Side-Band Use pins and are used for extended non-USB interfaces uses.

USB Type-C devices with USB Type-C connectors may support device detection, interface configuration, communication, and power delivery mechanisms according to the USB Type-C standard. USB Power Delivery Specification defines four standardized voltage levels: +5V DC, +9V DC, +15V DC, and +20V DC, while power supplies may provide electrical power from 0.5 W to 100 W and current from 0.1 A to 5.0 A depending on the specific power delivery mode. A USB Type-C device may transfer power in either direction and operate as a power source or a power sink.

USB Type-C devices may perform a negotiation process to establish a power delivery mode. The power delivery mode remains in effect unless altered by a re-negotiation process.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. The various figures described herein below are generally not to scale. For clarity, non-essential elements may have been omitted from some of the drawing.

Figure 3:
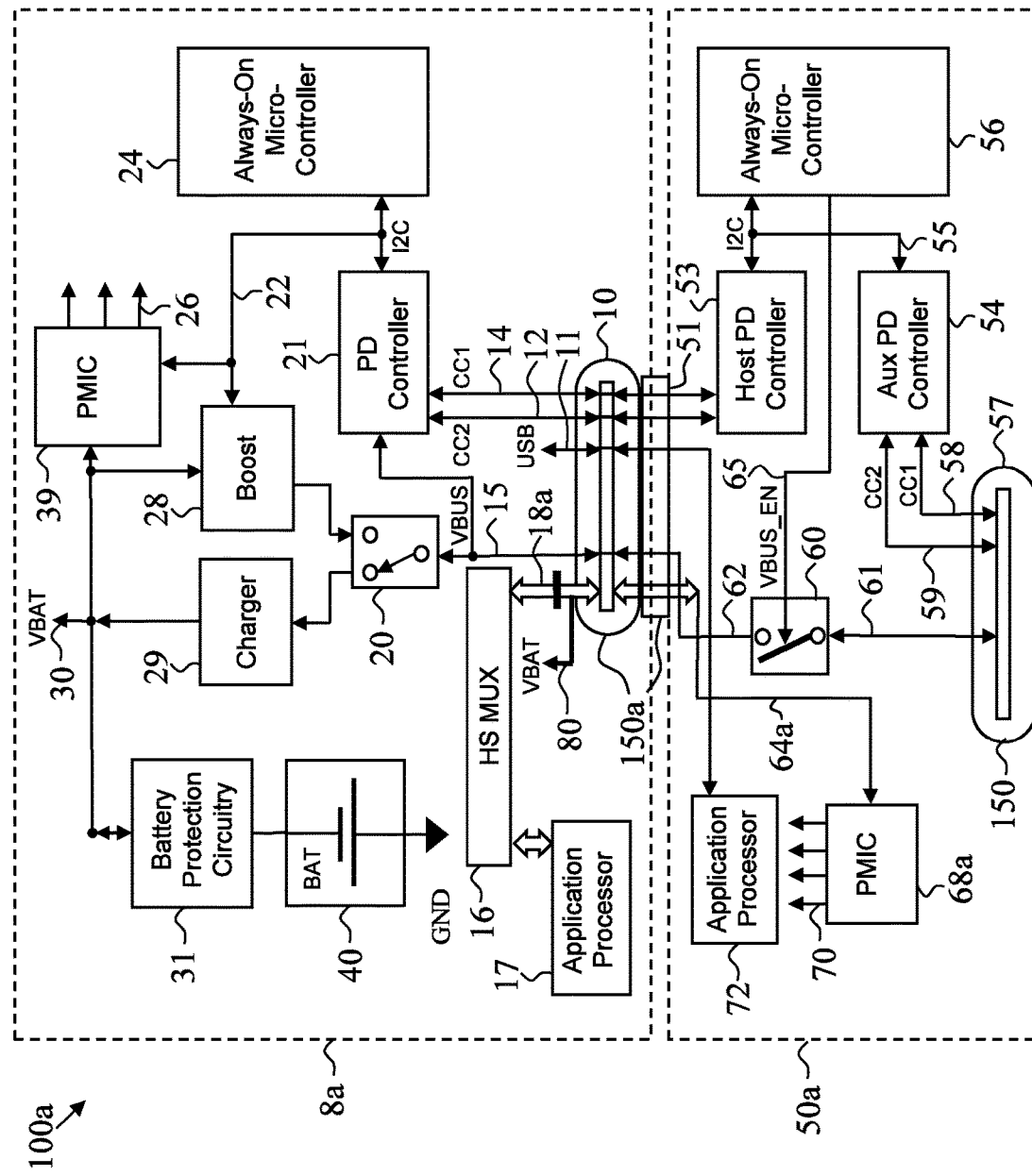
FIG. 3 is a high-level block diagram of smartphone with add-on peripheral device system according to an embodiment of the present invention.

Reference is made now to FIG. 3. FIG. 3 illustrates a high-level block diagram presenting an exemplary embodiment of the current invention of system 100a having a modified smartphone 8a and peripheral device 50a that is being powered by the modified smartphone 8a through higher efficiency power circuitry.

Modified smartphone 8a is powering peripheral device 50a. However, in this case, one or more of the pins of USB Type-C connector 10 were modified to deliver the power directly from the power output of the battery protection circuitry 31. In this exemplary embodiment of the present invention, the eight high-speed data pins of the USB type C connector 10 (pins A2, A3, A10, A11, B2, B3, B10, B11) were modified to deliver power from internal power bus, VBAT, 30. The modification is made by cutting the traces or removing serial components connecting these eight lines 18a and wiring conductor 80 to the eight high-speed data pins of the USB type C connector 10 (pins A2, A3, A10, A11, B2, B3, B10, B11) from one side and to VBAT 30. In this modification, high-speed communication will be disabled but peripheral device would still properly communicate and function with normal speed communication and without the high-speed communication. Standard USB Type-C charger will be able to charge modified smartphone 8a normally.

The number of pins in USB type C connector 10 that are used to directly deliver the power from battery 40 only through battery protection circuitry 31 to the add-on device, can be reduced or increased depending on the expected power consumption of the add-on device. Alternatively, only A2, A3, B10, B11 pins are used for power delivery and A10, A11, B2, B3 pins are used for high speed data transition. Another alternative embodiment is to use only A10, A11, B2, B3 pins for power delivery and A2, A3, B10, B11 pins for high speed data transition. Yet another option is to use SBU1 (pin A8) or SBU2 (pin B8) or both to deliver the power from battery 40 to the add-on device 50a. While Connector 10 and connector 51 are not changed the combined data/power interface 150a is now different than the combined data/power interface 150 (shown in FIG. 1). The high-speed data communication is disabled and new, non-regulated, direct from battery, power delivery is enabled in this modified combined data/power interface 150a.

As used herein, the terms "protected-battery power delivery" means a power delivery over the power delivery pins of combined data/power interface that is directly supplied from a battery via a battery protection circuitry. "protected-battery power delivery" does not pass through any voltage conversion circuitry nor any voltage regulation circuitry. The voltage on the power delivery pins in protected-battery power delivery mode is close to the battery voltage and differ only in an insignificant voltage drop over the battery protection circuitry and the voltage drops over the resistive element of the conductors between the battery and the power delivery pins. "PBPD" is an abbreviation for the term "protected-battery power delivery". The term "battery protection circuitry" means a circuitry that is conditioned upon at least any one of or any combination of (1) battery current, (2) battery voltage, and (3) battery temperature configured to protect the battery by performing at least one of or any combination of (1) cutoff the current between the battery electrodes, (2) limit the current between the battery electrodes, and (3) limit the voltage between the battery electrodes.

The term "protected-battery power delivery mode" means a specific power delivery mode, among several power delivery modes, of a combined data/power interface that apply protected-battery power delivery between the devices attached through the combined data/power interface. The terms "direct protected-battery power delivery" and "direct protected-battery power delivery mode" are essentially the same as the terms "protected-battery power delivery" and "protected-battery power delivery mode" respectively, and they are used wherever it is desired to emphasis the direct power flow between the battery, after battery protection circuitry, and the power delivery pins of the combined data/power interface.

The term "power delivery pin" means a pin in the connector of a combined data/power interface that is used for power delivery. The power delivery pin can deliver any type of electric power in any voltage and current specification. In specific, power delivery pin can transfer power in many delivery modes, such as, a DC fixed regulated voltage, i.e., regulated power delivery mode, protected-battery power delivery mode, non-protected and non-regulated, direct connection to the battery, power delivery mode, DC power delivery mode, AC power delivery mode, or any other combination of voltage and current in various time variation types and variety of circuitries setups between the two sides that transfer electric power between the devices. Power delivery pin may be statically set to permanently be used for a specific power delivery mode or may dynamically be used to deliver power in different delivery modes at different time. Alternatively, power delivery pin may be used in some scenarios not to transfer power but to transfer data, used for combined data/power interface configuration negotiation and the like. Optionally, power delivery pin may be used to transfer data or may be used for setup configuration simultaneously with power transfer. When the term power delivery pin is used in this document, it is in the context of delivering power in a given specific embodiment, however unless the context clearly dictates otherwise the power delivery pin may also be used in different scenario/situation/mode/time for different uses as mentioned hereinabove. Unless the context clearly dictates otherwise, the term power delivery pin includes a plurality of power delivery pins and the term power delivery pins include a single power delivery pin.

Connector 57 is used for charging the combined system 100a and to enable communication with the application processor 72 and optionally with application processor 17 through USB interface (not shown in the figure). In this exemplary embodiment, Connector 57 is an embodiment of a combined data/power interface 150 (shown in FIG. 1).

In this exemplary embodiment of the invention, peripheral device 50a is also modified compared to prior-art peripheral device 50 shown in FIG. 1 above. Diodes 64 and 67 (shown in FIG. 1) are removed and the power input to PMIC 68a is coupled directly to the eight high-speed lines of connector 51 through line 64a. PMIC 68a in peripheral device 50a may be the same IC or circuitry as PMIC 68 in the prior-art peripheral device 50 or alternatively a different circuitry or IC may be used. Alternatively, peripheral device 50a is designed explicitly for working with smartphone 8a.

While present invention system 100a looks similar to the prior-art system 100, the gain in performance in using PBPD with respect to the power consumption and the heat dissipation of system 100a is dramatic. Using PBPD in system 100a may increase battery endurance by 20% to 40% compared to system 100. The higher the power consumption of peripheral device 50a is, the higher the performance gain will be. The modified power path of protected-battery power delivery reduces both voltage conversion power losses as well as reduce the power losses due to other parasitic resistance in a voltage regulated power path that creates additional heat dissipation.

In an exemplary embodiment of the invention, battery 40 is removable and the battery protection circuitry 31 reside inside the removable battery enclosure. In this case, power bus, VBAT, 30 is presented in the pins of the connector that connects the removable battery 40 and the rest of the phone.

Figure 4:
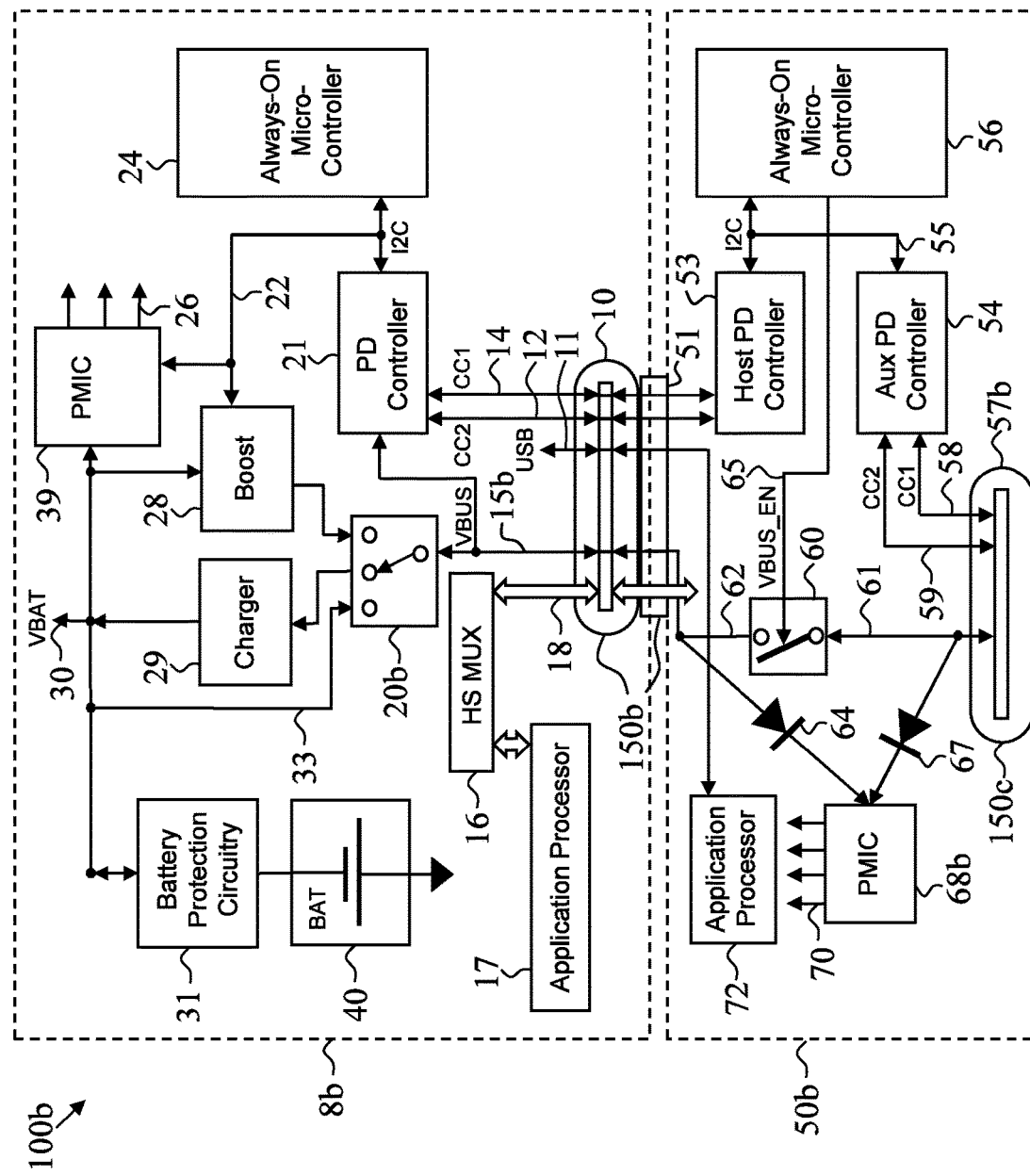
FIG. 4 is a high-level block diagram of smartphone with add-on peripheral device system according to another embodiment of the present invention.

Reference is made now to FIG. 4. FIG. 4 illustrates a high-level block diagram presenting another exemplary embodiment of the current invention of system 100b having a modified or originally designed smartphone 8b and peripheral device 50b that is being powered by smartphone 8b through power bus, VBAT, 30.

Similar to systems 100a, modified smartphone 8b is powering the coupled device 50b, but in this case, smartphone 8b includes three positions power switch 20b that allows power bus, VBUS, 15b to be coupled via switch 20b to power bus, VBAT, 30 through power line 33. PD Controller 21 may detect and negotiate the power delivery mode with Host PD controller 53. If both sides agree on protected-battery power delivery mode, PD Controller 21 will control switch 20b to allow VBUS pins of connector 10 to be connected to power bus, VBAT, 30. When add-on device 50b is being detected, and no external charger is connected to USB Type-C connector 57b, power switch 20b is selecting power bus, VBAT, 30. This allows battery 40 power to flow through battery protection circuitry 31 to power bus VBUS 15b directly and to supply to PMIC 68b of peripheral device 50b thorough diode 64. When external charger is connected to USB Type-C connector 57b, the power flows from VBUS pins (A4, A9, B4, B9) of connector 57b thorough diode 67 to PMIC 68b.

Connector 57b is used for charging the combined system 100b and to enable communication with the application processor 72 and optionally to application processor 17 through USB interface (not shown in the figure). Combined data/power interface 150b is similar to combined data/power interface 150 (shown in FIG. 1) with one modification. The modification is that interface 150b power lines, VBUS, are able to deliver either regulated voltage from boost voltage regulator 28 or non-regulated protected-battery voltage from power bus 30 (VBAT). The type of voltage or power on the power delivery pins 15 is determined by negotiation between PD Controller 21 and Host PD controller 53. Combined data/power interface 150c may be identical to combined data/power interface 150 (shown in FIG. 1) or modified versions of the standard interface presented in interfaces 150a or 150b. In an exemplary embodiment of the invention, combined data/power interface 150c is a different interface than the combined data/power interfaces presented above. For example, combined data/power interface 150c may be USB 2.0 interface and connector 57b may be type-B micro USB receptacle. Alternatively, combined data/power interface 150c may be a non-USB interface such as Thunderbolt, RJ45 connector running Power-Over-Ethernet (PoE) interface or the like.

Both in exemplary embodiment of system 100a and system 100b when the power supply of the add-on device is PBPD, the power supply to the add-on device is completely independent of the power mode, e.g., power save mode, of modified smartphone 8a or smartphone 8b. Application processor 72 is powered as long as battery 40 provides useful power. Smartphone 8a or smartphone 8b may be charged, discharged, turned on or off but add-on device 50a or 50b is still be getting power from battery 40. Such power supply independence may be vital for critical processes running in application processor 72. In an exemplary embodiment of the invention, the negotiation protocol between PD Controller 21 and Host PD controller 53 starts with a request issued by PD Controller 21 to Host PD controller 53. The returned information may include add-on device 50b power consumption needs, add-on device ability to receive protected-battery power delivery, and the voltage range it can accept in this PBPD mode. Condition upon the received-back information, PD Controller 21 may request from Host PD controller 53 to enter protected-battery power delivery mode, and upon PD controller 53 accept message, PD Controller 21 will trigger the power delivery mode change. In an exemplary embodiment of the invention, protected-battery power delivery pins are used as data pins or regulated power delivery pins in times they are not used as protected-battery power delivery pins. In an exemplary embodiment of the invention, the combined data/power interface comprises negotiation pins that are used to establish communication between the smartphone and the add-on in order to configure the combined data/power interface. Additionally, protected-battery power delivery is started conditioned upon negotiation between the smartphone and the add-on device.

Figure 5:
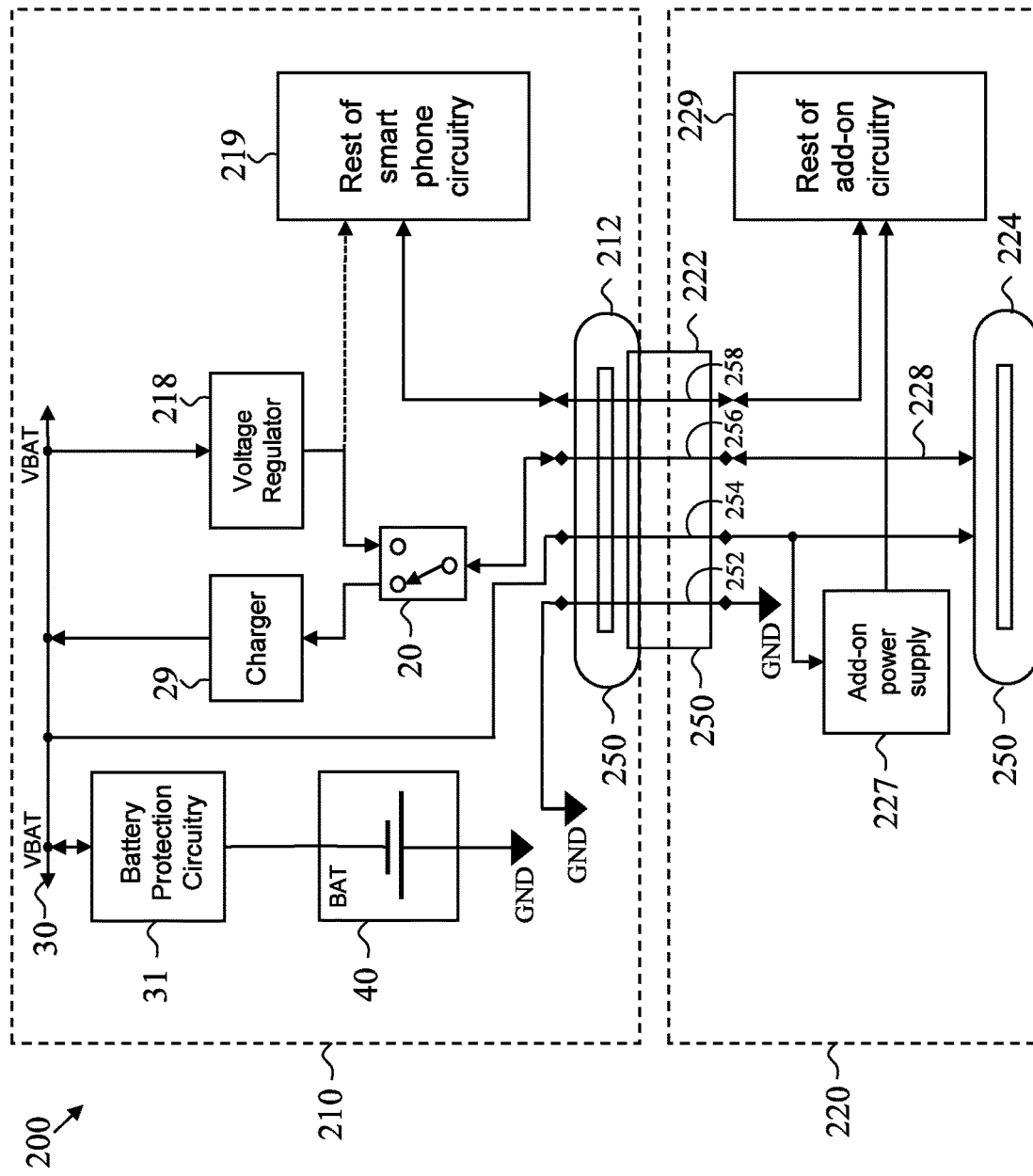
FIG. 5 is a simplified block diagram of smartphone with add-on peripheral device system in accordance with some embodiments of the present invention.

Reference is made now to FIG. 5. FIG. 5 illustrates a simplified block diagram presenting a general concept of power delivery between smartphone and add-on device over combined data/power interface 250. System 200 comprising smartphone 210 and add-on device 220. Add-on device 220 is being powered by the smartphone 210. Smartphone 210 and add-on device 220 transfer power and data between each other using a combined data/power interface 250. Combined data/power interface 250 in smartphone 210 comprises connector 212. Combined data/power interface 250 in add-on device 220 comprises connector 222. connector 222 is a matching connector to connector 212.

Smartphone 210 comprises a rechargeable battery 40. Electrodes of battery 40 are connected to a battery protection circuitry 31 that is configured to protect battery 40 by cutoff or limit the current or voltage on battery 40 electrodes. The protection can be from events of over-voltage, over-current, switch-on or in-rush current, battery overheat and the like. Battery protection circuitry 31 prevent any situation that will cause damage to the battery, in general, and battery overheat and battery explosion, in specific.

Combined data/power interface 250 connectors 212 and 222 comprises each a plurality of matching pins partitioned to four groups of pins, pins 252, 254, 256 and 258. Pins 252 are ground pins closing the circuits of the power supply as well as provide a return path to the data signals. Pins 258 are data pins for transferring data between smartphone 210 and the add-on device 220. The data is transferred between the circuitries, e.g., application processor, of circuitry 219 of smartphone 210 and circuitry 229 of add-on device 220. The power delivery pins are divided to one or more regulated power delivery pins 256 and one or more, non-regulated, direct protected-battery power delivery pins 254. The regulated power delivery pins 256 are connected to a power switch 20 of smartphone 210. When available power (i.e. high enough voltage) exists on regulated power delivery pins 256, switch 20 connects a charger 29 to a battery power bus 30 that is designated by the name VBAT. VBAT 30 is connected to battery protection circuitry 31. During normal operation the voltage drop over battery protection circuitry 31 is very low and essentially the VBAT voltage is the same as battery 40 voltage. In battery 40 charging, VBAT voltage will be a bit higher than battery 40 voltage, and in discharging, i.e., when battery 40 powers the smartphone 210 or add-on device 220, VBAT voltage will be a bit lower than battery 40 voltage. In charging, charger 29 output port drives the suitable charging voltage and charging current to the power bus, VBUS, 30 and through battery protection circuitry 31 charge battery 40.

Regulated power delivery pins 256 are used to charge battery 40 of smartphone 210 from an external charger connected to connector 224 of add-on device 220. Connector 224 is the same type of connector as connector 212 and implements the same combined data/power interface 250 used between smartphone 210 and add-on device 220. Alternatively, connector 224 is a different connector. In an exemplary embodiment of the invention, connector 224 is power only connector. Yet in another exemplary embodiment of the invention, connector 224 is a connector of combined data/power interface with different standard or different protocol than the one that is used between smartphone 210 and add-on device 220. When external charger is connected to connector 224 of add-on device 220 the power from the external charger is connected to regulated power delivery pins 256 and the power flows through switch 20, charger 29, and battery protection circuitry 31 to battery 40. Switch 20 control signal is driven from circuitry 219 that have sensors and controller to sense and react upon the status of regulated power delivery pins 256. For sake of diagram clarity those elements and circuitry are not shown on the figure.

When regulated power delivery pins 256 are not connected to external power, optionally, switch 20 connects pins 256 to voltage regulator 218 of smartphone 210. In this case, power from battery 40 is regulated, i.e., the VBAT 30 voltage is down-converted or up-converted or just stabilized to a nominal voltage similar to VBAT nominal voltage. The power output of voltage regulator 218 flows through switch 20, pins 256 of connectors 212 and 222 and line 228 to connector 224. Optionally, another (second in the chain) add-on device is powered through connector 224. In an exemplary embodiment of the invention, the system is configured to couple a plurality of add-on devices by chaining add-one devices one to each other over a chain of combined data/power interfaces.

Protected-battery power delivery pins 254 are used to efficiently and uninterruptedly power add-on device 220. Protected-battery power delivery pins 254 of connector 212 are connected to power bus, VBAT, 30, i.e., to battery protection circuitry 31 of battery 40 of smartphone 210. Protected-battery power delivery pins 254 of connector 214 are connected to power supply 227 of add-on device 220. Power supply 227 provides the power to circuitry 229 of add-on device 220. In an exemplary embodiment of the invention, power supply 227 is a single-voltage voltage regulator. Alternatively, power supply 227 is multiple-voltage voltage regulator. Yet another alternative is that power supply 227 is a power management integrated circuit PMIC (similar to PMIC 68 shown in FIG. 1). In this exemplary embodiment of the invention, Add-on device 220 is powered by the battery of smartphone through protected-battery power delivery pins 254. Additionally, some circuitry of add-on device 220 may be powered through regulated power delivery pins 256. In an exemplary embodiment of the invention, another add-on device (second in the chain) may be powered by the battery of smartphone through protected-battery power delivery pins 254 and additional pins in connector 224.

In an exemplary embodiment of the invention, protected-battery power delivery pins 254 of combined data/power interface 250 are dedicated pins that are assigned to transfer power directly to/from a battery protection circuitry. Additionally or alternatively, protected-battery power delivery pins 254 are pins that are not used by combined data/power interface 250. Additionally or alternatively, protected-battery power delivery pins 254 of combined data/power interface 250 are pins that typically, when not used for PBPD mode, are used to other non-essential functions, such as, extended data transfer channels, non-essential regulated power supply, non-essential negotiation between devices and the like.

In an exemplary embodiment of the invention, an off-the-shelf smartphone is modified to support the protected-battery power delivery pins 254 of combined data/power interface 250 in accordance with the present invention. The modification method comprises two steps: (1) disconnecting existing connections of newly assigned protected-battery power delivery pins 254, and (2) connecting this newly assigned protected-battery power delivery pins 254 to battery protection circuitry 31.

In an exemplary embodiment of the invention, an off-the-shelf add-on device is modified to support the protected-battery power delivery pins 254 of combined data/power interface 250 in accordance with the present invention. The modification method comprises the steps of disconnecting legacy connection of protected-battery power delivery pins 254 and connecting this protected-battery power delivery pins 254 to the Legacy power supply/PMIC of the off-the-shelf add-on device. Optionally, a step of replacing the supply/PMIC of the off-the-shelf add-on device is added. In an exemplary embodiment of the invention, an off-the-shelf smartphone is modified to support the protected-battery power delivery pins 254 of combined data/power interface 250 with a single step of connecting a newly assigned protected-battery power delivery pins 254 to battery protection circuitry 31. In this case, either the newly assigned protected-battery power delivery pins 254 are not in use or the newly assigned protected-battery power delivery pins 254 can be used simultaneously for both the protected-battery power delivery and its original function. For example, high speed data pins may be used simultaneously for power delivery when the data signal are AC coupled so that the DC power is supplied and delivered between the power source and the power sink while the AC data signals are not effecting or filtered out by the power sink from one hand and the DC voltage is filtered out by the AC coupling from the data signals sources and sinks.

Figure 6:
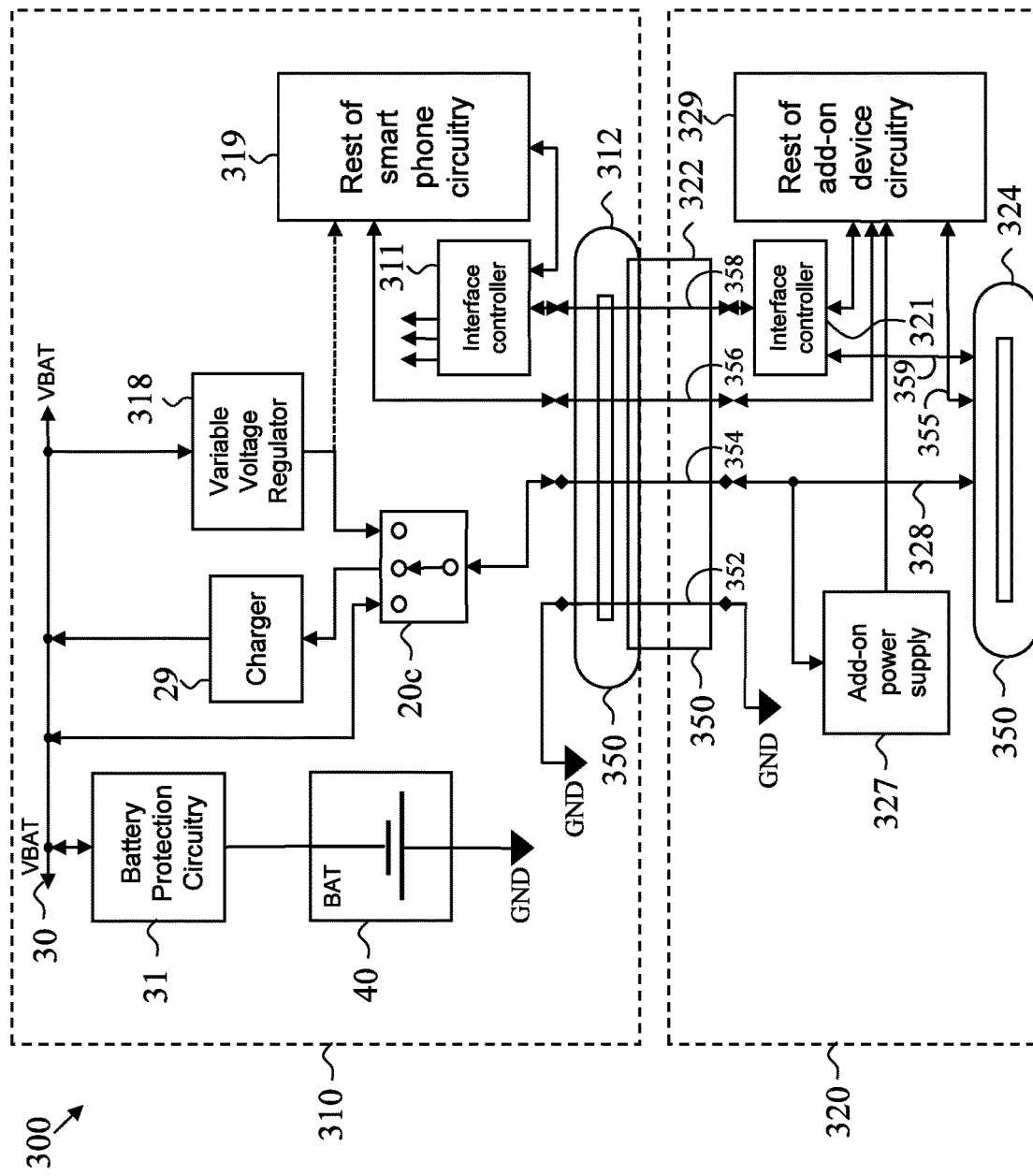
FIG. 6 is a simplified block diagram of smartphone with add-on peripheral device system in accordance with some other embodiments of the present invention.

Reference is made now to FIG. 6. FIG. 6 illustrates simplified block diagram presenting another general concept of power delivery between smartphone and add-on device over combined data/power interface 350. System 300 comprising smartphone 310 and add-on device 320. Add-on device 320 is being powered by the smartphone 310. Smartphone 310 and add-on device 320 transfer power and data between each other using a combined data/power interface 350. Combined data/power interface 350 in smartphone 310 comprises connector 312. Combined data/power interface 350 in add-on device 320 comprises connector 322. connector 322 is a matching connector to connector 312.

Smartphone 310 comprises rechargeable battery 40, battery protection circuitry 31, VBAT bus 30 and charger 29 similar to the ones in prior art system 100 and present invention systems 100a, 100b and 200.

Combined data/power interface 350 connectors 312 and 322 comprises each a plurality of matching pins partitioned to four groups of pins, pins 352, 354, 356 and 358. Pins 352 are ground pins for closing the circuits of the power supply as well as provide a return path to the data signals. Pins 356 are data pins for transferring data between smartphone 310 and the add-on device 320. The data is transferred between circuitry 319 of smartphone 310 and circuitry 329 of add-on device 320 via connectors 312 and 322. Data pins 356 of connector 322 that comply with combined data/power interface 350 are connected to circuitry 329 and circuitry 329 is connected to data pins 355 in connector 324 of add-on device 320. This arrangement enables data transfer, using combined data/power interface 350 protocols, between another add-on device connected via connector 324 and both the add-on device 320 and smartphone 310.

Negotiation pins 358 are used for combined data/power interface 350 negotiation, setup and configuration functions. Interface controller 311 of smartphone 310 communicate with interface controller 321 of add-on device 320 to setup the configuration and the usage of the pins in combined data/power interface 350 instance implemented using connectors 312 and 322. The configuration procedure can setup many parameters of the combined data/power interface 350. For example, the negotiation can set the communication data rate, the supported version of the standard, the arbitration scheme, e.g. which side is the master and which side is the slave and the like. In specific, the negotiation and configuration can be on power delivery modes and, optionally, on pin assignment for the power delivery.

Power delivery pins 354 in connector 312 and 322 are used for power delivery between smartphone 310 and add-on device 320. In an exemplary embodiment of the invention, the power delivery pins 354 are configurable, i.e. the voltage, the power flow direction, the maximum delivered power and the like can be dynamically change after successful negotiation between interface controllers 311 and 321. Optionally, the power delivery pins 354 locations on connectors 312 and 322 may be dynamically assigned. In an exemplary embodiment of the invention, the protected-battery power delivery pins are pins that when not used by the combined data/power interface as protected-battery power delivery pins are used as data pins or regulated power delivery pins. In an exemplary embodiment of the invention, the smartphone and the add-on device are able to switch the direction of power delivery of one or more pins of combined data/power interface between power flow from the smartphone to the add-on device and power flow from the add-on device to the smartphone.

Interface controller 321, in addition to its connection to pins 358 of connector 322, is connected to negotiation pins 359 of connector 324 to enable setup of the mode with another peripheral device that may be connected to add-on device 320. The setup can configure, protected-battery power delivery modes or data transfer modes between this second in chain peripheral device and smartphone 310.

Smartphone 310 can use power delivery pins 354 in several modes, according to interface controller 311 decisions that are condition upon the negotiation with the interface controller 321 of add-on device 320. In an exemplary embodiment of the invention, smartphone 310 comprises variable voltage regulator 318. Variable voltage regulator 318 can provide different regulated voltages in its output. For example, variable voltage regulator 318 can provide either +3.3V or +5V. In an exemplary embodiment of the invention, variable voltage regulator 318 can provide voltage between +0.5V and +10V in steps of 0.1V. In an exemplary embodiment of the invention, variable voltage regulator 318 has a plurality of outputs each can be assigned with different output voltage. Variable voltage regulator 318 is controlled by interface controller 311.

Smartphone 310 comprises switch 20c. Switch 20c select the power routing between power delivery pins 354 and variable voltage regulator 318 output, Charger 29 output and power bus, VBAT, 30, i.e., the battery protection circuitry 31 bidirectional power port. switch 20c is controlled by interface controller 311. In an exemplary embodiment of the invention, switch 20c is connected to one or more of power delivery pins 354 and smartphone 310 can be in one of the following three power delivery mods: (1) delivering to power delivery pins 354 and to add-one device a regulated power from variable voltage regulator 318 (the nominal voltage in the pins can vary upon negotiation), (2) charging battery 40 using charger 29 by power delivered from power delivery pins 354, and (3) delivering a protected-battery power coming directly from power bus, VBAT, 30.

In another exemplary embodiment of the invention, switch 20c is multiport switch, i.e. a power switch matrix, that can route simultaneously different type of power lines to different subgroups of power delivery pins 354. For example, upon successful negotiation between Interface controllers 311 and 321, interface controller 311 may set: (1) one pin of power delivery pins 354 to be regulated +5V and set switch 20c to connect variable voltage regulator 318 to this pin, (2) set another pin of power delivery pins 354 to be charging power and set switch 20c to connect charger 29 to this pin, and (3) set the rest of the pins of power delivery pins 354, e.g., 4 pins, to be protected-battery power delivery pins and set switch 20c to connect power bus, VBAT, 30 to these pins. In this case, a power from external charger can charge the battery while some circuits in add-on device 320 are powered by smartphone 310 regulated power supply while other circuits in add-on device 320 are powered by power bus, VBAT, 30 protected-battery power delivery mode.

When external charger is connected to connector 324 of add-on device 320 conditioned upon negotiation between interface controller 321 and interface controller 311, the power from the external charger is flowing from power delivery pins of connector 324 through line 328, power delivery pins 354, switch 20c, charger 29, and battery protection circuitry 31 to battery 40.

When add-on device 320 that is capable of receiving high power, protected-battery power delivery mode is connected to connector 312 of smartphone 310, conditioned upon negotiation between interface controller 321 and interface controller 311, the power supply flow for add-on device 320 is flowing from battery 40 through battery protection circuitry 31, switch 20c, power delivery pins 354, add-on device power supply 327 to circuitry 329. In this case, undesired up and down voltage conversion is avoided. protected-battery power delivery pins 254 are used to deliver efficiently and uninterruptedly power to add-on device 320. Power delivery pins 354 of connector 312 are dynamically set to be protected-battery power delivery pins providing protected-battery power delivery mode. Power supply 327 is configured, in this case, to cope with the non-regulated nature of the power delivery and to efficiently provide the power to circuitry 329 of add-on device 320. In an exemplary embodiment of the invention, power supply 327 is a single-voltage voltage regulator. Alternatively, power supply 327 is multiple-voltage voltage regulator. Yet another alternative is that power supply 327 is power management integrated circuit (PMIC) (similar to PMIC 68 shown in FIG. 1).

In an exemplary embodiment of the invention, another add-on device (second in the chain) may be powered by the battery of smartphone through power delivery pins 354 in protected-battery power delivery mode. Such a scheme will be negotiated by interface 321 on behalf of the second in the chain add-on device using negotiation pins 359 of connector 324.

In an exemplary embodiment of the invention, power delivery pins 354 of combined data/power interface 250 are pins that are typically used to function as non-power pins, such as data pins, but during negotiation, since their function was not needed or not supported by at least one side of the negotiating parties in the combined data/power interface, they had been assigned as a power delivery pins 354 and optionally, had been assigned as protected-battery power delivery pins.

Figure 7:
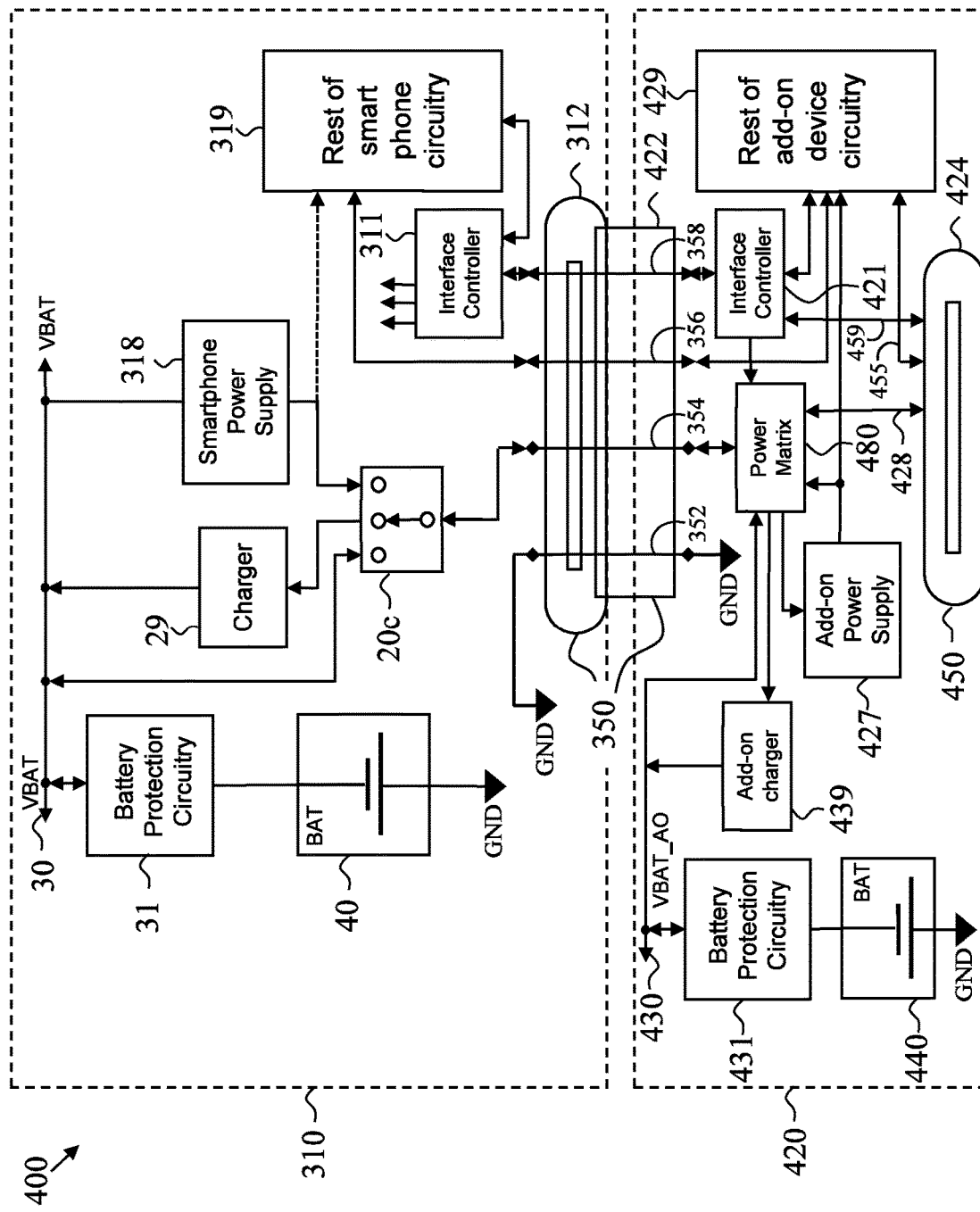
FIG. 7 is a simplified block diagram of a system comprising smartphone with add-on peripheral device comprising rechargeable battery in accordance with yet other embodiments of the present invention.

Reference is made now to FIG. 7. FIG. 7 illustrates a system 400 with smartphone 310 (identical to the one presented in FIG. 6) and another version of add-on device 420. Add-on device 420 comprising a rechargeable battery 440 that is configured to supply power to smartphone 310. Add-on device 420 may be a portable power pack, or a peripheral device with sufficient enough battery capacity to support both the peripheral device own consumption as well as design to enlarge smartphone 310 usage time. Add-on device 420 comprises battery protection circuitry 431 protects battery 440 from dangerous conditions such as over-temperature, short-circuit, over-current, low voltage or the like. The power output of the battery protection circuitry 431 is driving an internal power bus 430 that is designated as VBAT_AO. In addition, Add-on device 420 comprises charger 439 to enable charging of battery 440. Charger 439 controls the suitable charging process parameters, such as, the charging current, the battery voltage to charge battery 440. Charger 439 set the battery voltage threshold that triggers the stop of charging. The charger may monitor various charging-related parameters or other operating parameters received from the batteries and the system to set the optimal charging parameters.

The data transfer functionality between smartphone 310, connector 312, connector 422, circuitry 429 and connector 424 and, optionally another external add-on device, are similar to the ones described for system 300. To support the additional power paths of this system 400 with two batteries, one in smartphone 310 and one in add-on device 420 a new power matrix 480 is added to add-on device 420.

Power matrix 480 have 6 power ports: (1) bidirectional power port connected to power delivery pins 354 in connector 422 that can deliver power from smartphone 310 to add-on device 420 or vice versa, (2) bidirectional power port connected to power line 428 that is connected to the power delivery pins of connector 450 that can deliver power to or from the additional in the chain peripheral device or an external battery charger, (3) input power port from add-on power supply 427 output, (4) output power port for driving the add-on power supply 427 input port, (5) output power port for driving add-on charger 439 input port, and (6) bidirectional power port connected to power bus, VBAT_AO, 430. Additionally, power matrix 480 have control port that is driven from interface controller 421.

Many power modes are possible in system 400. Standard charging using external charger is possible both for battery 40 of smartphone 310 and battery 440 of add-on device 420. In addition, charging battery 40 of smartphone 310 using regulated voltage from add-on power supply 427 or charging battery 440 of add-on device 420 using regulated voltage from smartphone's variable voltage regulator 318 are possible too. However, in an exemplary embodiment of the invention, for efficient delivery of power between battery 440 and battery 40 or vice versa, protected-battery power delivery mode is provided in system 400. In this protected-battery power delivery mode, the power from battery 440 flows directly through battery protection circuitry 431, power switch 480 that connects power bus, VBAT_AO, 430 to power delivery pins 354 in connector 422, switch 20c that connects power delivery pins 354 to power bus, VBAT, 30 and battery protection circuitry 31 to battery 40. No voltage conversion is done in this path and the only resistance between batteries 40 and 400 incurred by open channel power FETs or the like in battery protection circuitries 31 and 431 and in switches 20c and 480 which are typically very low, and by resistance of the conductive elements in the path in smartphone 310, combined data/power interface 350, and add-on device 420. Such power transfer is the most efficient power delivery between these batteries. It should be mentioned that when this charging path is enabled the power will flow from the higher voltage battery to the lower voltage battery and if left for enough time the current flow will continue until the batteries will reach an equilibrium voltage. If the voltage difference is too high a large current may flow between the batteries but if such current exceed the limit of any of battery protection circuitry 31 or battery protection circuitry 431 the battery protection circuits 31 or 431 either limit the current or shut off the current intermittently to protect batteries 40 and 440 from damages. Using this battery protection circuitries 31 and 431 as the limiting elements allows the fastest most efficient charging from on hand and a safe charging from the other hand.

The control of engaging into direct batteries charging is performed by negotiation between interface controller 311 and interface controller 421.

It is evident that many scenarios and control schemes can be used with this type of charging mode between the smartphone and the add-on device, the following section describes a scenario where a portable power pack is attached to a smartphone and the aim is to charge battery 40 of smartphone 310 to fully charged state as quicker as possible. Other scenarios management with the essential modification will be apparent to those skilled in the art.

At first engagement interface controller 421 offer interface controller 311 to charge battery 40. Upon agreement of performing charging, interface controller 421 inquires interface controller 311 about battery 40 parameters and battery 40 present state information, such as, battery 40 present voltage, nominal full capacity and present power capacity. If the condition for efficient direct battery to battery charging is met interface controller 421 inquires interface controller 311 on its ability and willing to perform direct battery to battery charging. If this charging mode is accepted by interface controller 311, interface controller 421 will instruct power switch 480 to connect power bus 430 to power delivery pins 354 and interface controller 311 will instruct switch 20c to connect power delivery pins 354 to power bus 30 and direct charging mode will start. Both sides will monitor the progress and will exchange information regarding batteries 40 and 400 status. If battery 40 become full, interface controller 311 and interface controller 421 will end direct charging mode and get back to default power delivery mode. If during the monitoring, the voltage difference between battery 400 and battery 40 drops below a certain threshold, for example, 10 mV, 50 mV, 100 mV or the like, or alternatively, the charging current drops below a certain threshold, for example, 1 A, 0.5 A, 0.1 A or the like, each side can initiate a request to stop direct charging mode and change to standard charging mode. In this mode interface controller 421 will instruct Power matrix 480 to connect power bus 430 to add-on power supply 427. add-on power supply 427 will boost battery 400 voltage to nominal regulated voltage such as +5V. In addition, interface controller 421 will instruct Power matrix 480 to connect the power output port of add-on power supply 427 to power delivery pins 354 in connector 422. Interface controller 421 will instruct switch 20c to connect power delivery pins 354 in connector 312 to charger 29 input port. In this case, charger 29 will charge battery 40 from battery 400. However, the path of charging contains voltage up-conversion in add-on power supply 427 and voltage down conversion in charger 29 that waste from 10%-50% percent of the delivered power from battery 440 on heat in add-on power supply 427 and charger 29 compared to less then 5% in the direct charging alternative. In an exemplary embodiment of the invention, some pins of combined data/power interface are configured to be dynamically switched between usage as regulated power delivery pins and usage as protected-battery power delivery pins. In an exemplary embodiment of the invention, add-on device 420 comprises a plurality of combined data/power interface to power simultaneously several smartphones and/or add-on devices.

Figure 8:
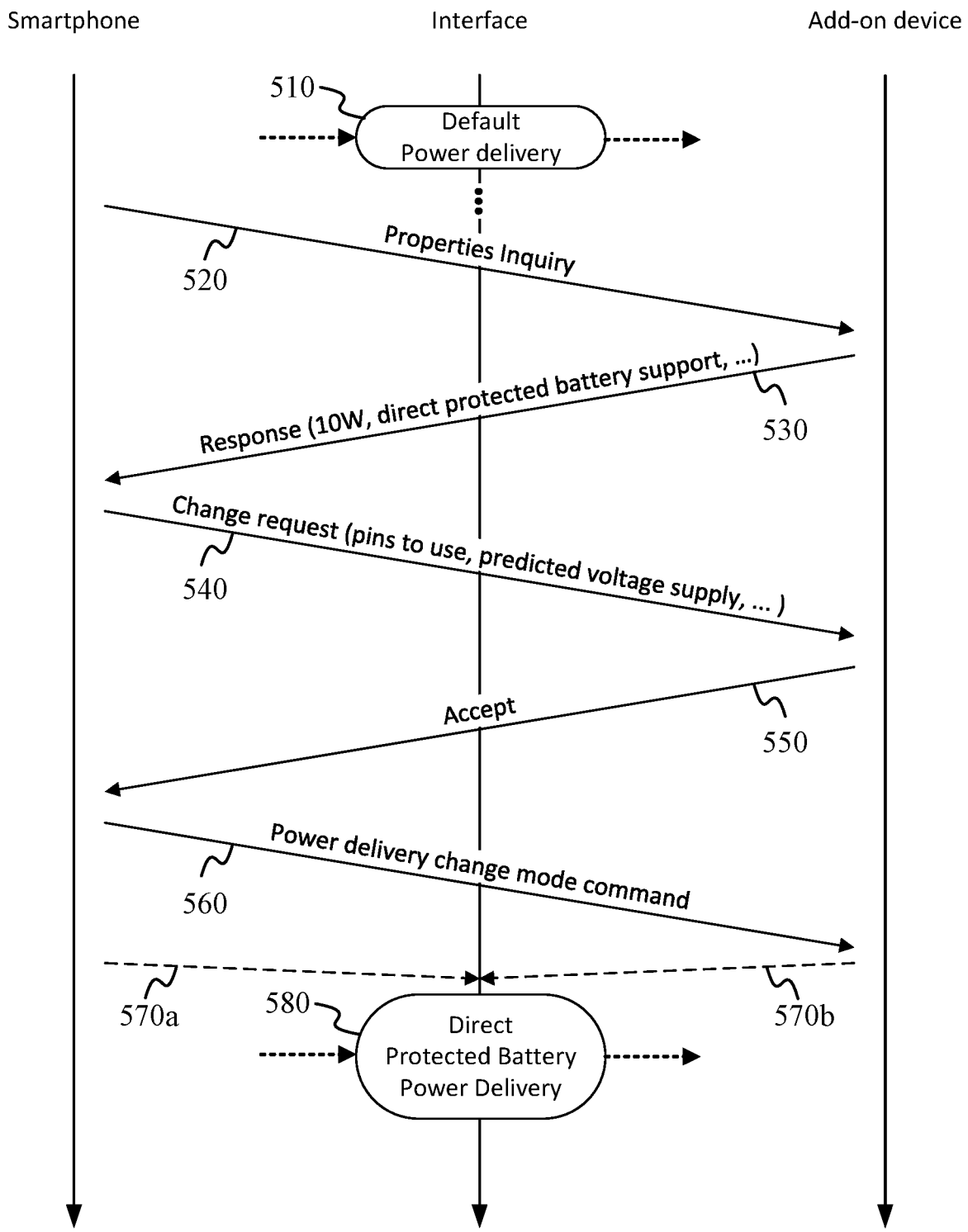
FIG. 8 is a time flow diagram of power delivery mode negotiation and setup in accordance to some aspects of the present invention.

Reference is made now to FIG. 8. FIG. 8 illustrates a time flow of power delivery mode negotiation and setup in accordance to some aspects of the present invention. The time in the illustration flows from top to bottom. Three entities participate in the illustration: (a) the smartphone, in general, and PD Controller 21 or Interface Controller 311, in specific, (2) combined data/power interface, in general, and interfaces 150a, 150b, 250 and 350, in specific, and (3) Add-on device, in general, and 50a, 50b, 220, 320 and 420, in specific. At start time in the diagram, a default power delivery 510 is provided by the combined data/power interface. In this case shown by diagram, the power is delivered from the smartphone to the add-on device as illustrated by the dashed arrows from the smartphone side to the add-on device side. Typically, this power delivery mode will be provided by one or more regulated +5V power delivery pins. At some point in time the smartphone sends a properties inquiry message 520 to the add-on device. The add-on device properties, in general, can be any data about the add-on device, that is relevant to the co-operation between the smartphone and the add-on device. In specific, any data relevant to the power delivery mode, such as, the power consumption of add-on device, the supported power delivery mode, and the like, are properties that may inquired by the smartphone and send as a response by the add-on device. In response to inquiry 520, the add-on device responds with a response message 530. Response message 530, in this case, contains properties of the add-on device, which among other properties, contains an average power consumption of 10 Watts, and a direct protected-battery power delivery mode support indicator. Upon delivery of the data in message 530, the smartphone decides it will be more efficient to switch from the standard power delivery mode to direct protected-battery power delivery mode. The smartphone decision is made taking in account the power consumption of the add-on device, its native voltage operation and the like. A change of power delivery mode request message 540 is sent accordingly. Message 540 includes all necessary information such as pins that are going to be used, the predicted voltage range that will be delivered, and the like, to perform the power delivery mode change. In return, add-on device sends and accept message 550. Upon receiving message 550 the smartphone sends power delivery change mode command 560. Command 560 may contain some parameters to ensure safe power delivery change mode. In specific, when relevant, the parameters include instructions to avoid a situation during the power delivery mode switch that may cause damages, such as, a situation where both sides are driving power to the same pin and the like. Next to command 560, both side of the combined data/power interface: the smartphone and the add-on device, switch to direct protected-battery power delivery mode 580. The change is done in such a way that a minimum or not at all interruption to power supply occurs. For example, in this case, no change in power delivery direction is performed. Both in the power delivery mode 510 before the mode change and in the power delivery mode 580 after the mode change, the power flow is from the smartphone to the add-on device as illustrated by the dash line arrows in the illustration of each of the modes. To change the power delivery mode, the smartphone performs operations 570a and the add-on device perform operations 570b. Operations 570a comprises connecting the power delivery pins of the combined data/power interface to the output port of battery protection circuitry 31. Operations 570a comprises sensing the voltage on the power delivery pins of the combined data/power interface and upon detection of the voltage drop the add-on, optionally if needed. Switch the power supply circuits that drive the power to the rest of the add-on device circuitry.

Figure 9:
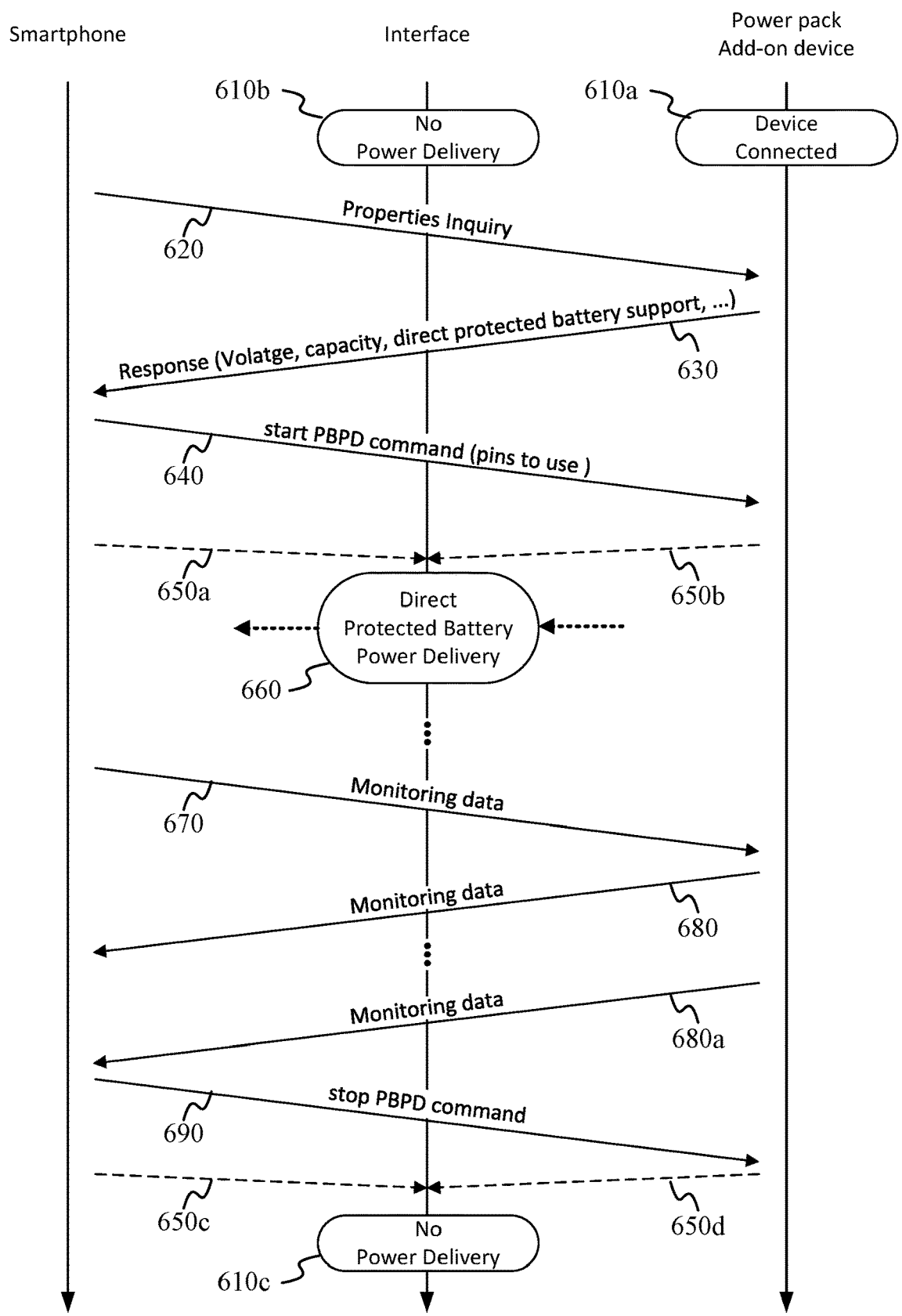
FIG. 9 is a time flow diagram of power delivery mode negotiation and setup in accordance to some other aspects of the present invention.

Reference is made now to FIG. 9. FIG. 9 illustrates a time flow of power delivery mode negotiation and setup in accordance to some other aspects of the present invention. The time in the illustration flows from top to bottom. The three entities participate in the illustration are similar as in FIG. 8, however in this case the add-on device is a power pack device contains a battery that can charge the smartphone.

At start time in the diagram, the add-on device is connected to the smartphone 610a over the combined data/power interface and no power delivery 610b is made over the combined data/power interface at this time.

When the smartphone detects the attachment of the add-on device, the smartphone sends a properties inquiry message 620 to the add-on device. The add-on device properties, in general, can be any data about the add-on device that is relevant to the co-operation between the smartphone and the add-on device. In specific, any data relevant to the power delivery mode, such as, the power consumption of add-on device, the supported power delivery mode and the like are properties that may inquired by the smartphone and send as a response by the add-on device.

In response to inquiry 620, the add-on device, i.e., the power pack device, responds with a response message 630. Response message 630, in this case, contains properties of the power pack device, which among other properties, contains the native voltage of the power pack batteries, the power capacity of the power ack, and the indication that the power pack support direct protected-battery power delivery mode. Upon delivery of this data in message 630, If battery 440 voltage is higher than the battery 40 of the smartphone the smartphone decides to efficiently charge its battery 40 using direct protected-battery power delivery mode. A start of power delivery mode command message 640 is sent accordingly. Message 640 includes all necessary information such as pins that are going to be used and the like, to perform this power delivery mode. Additionally, command 640 may continue some parameters to ensure safe power delivery change mode.

Next to command 640, both side of the combined data/power interface: the smartphone and the add-on device switch to direct protected-battery power delivery mode 660. The power delivery direction in this case is from the add-on device to the smartphone. To change the power delivery mode, the smartphone performs operations 650a and the add-on device perform operations 650b. Operations 650a comprises connecting the power delivery pins of the combined data/power interface to power bus, VBAT 30. Operations 650b comprises sensing the voltage on the power delivery pins of the combined data/power interface, and upon detection of the voltage from battery 40 of the smartphone, connects power bus, VBAT_AO, 430.

In an exemplary embodiment of the invention, from time to time the smartphone send monitoring messages 670 to the add-on device, and add-on device send monitoring messages 680 to the smartphone. The sensing capability and the data in monitoring messages may include the voltage of the battery, the voltage in each cell of the battery, the direction of the current flow and the magnitude of the current flow to/from the battery, the level of energy in each battery, the temperature in each battery, the temperature in each cell of the battery and the like. Upon receiving monitoring messages 680a from the add-on device to the smartphone, the smartphone decides to stop the direct protected-battery power delivery from add-on device. The decision may be made based on the fact that the battery is almost full, the charging current fall below some predefined threshold, the temperature of any of the batteries exceed a certain threshold or the like. To stop the protected-battery power delivery a stop command message 690 is send from the smartphone to the add-on device. To stop the power delivery and get back to the no power delivery mode 610c, the smartphone performs operations 650c and the add-on device perform operations 650d. Operations 650c comprises disconnecting the power delivery pins of the combined data/power interface to power bus, VBAT 30. Operations 650b comprises disconnect power bus, VBAT_AO 430 from power delivery pins of the combined data/power interface.

While FIG. 8 and FIG. 9 shows two simple scenarios where protected-battery power delivery mode is used for power an add-on device by a smartphone and to power/charge a smartphone from an add-on device it is apparent to those skilled in the art that many other scenarios or situation and many other negotiation messages and protocols may be used in to accomplished this efficient power delivery mode. In an exemplary embodiment of the invention, the smartphone is running an operating system. The operating system may be any one of (1) Android, (2) iOS, (4) Windows Phones, (5) Windows Mobile, Chrome OS and the like.

It is expected that during the life of a patent maturing from this application many relevant combined data/power interfaces will be developed and the scope of the term combined data/power interfaces is intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise. For example, the term "a standard" may include a plurality of standards.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 10 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system incorporating a smartphone comprising:
   a smartphone comprising a rechargeable battery, a battery protection circuitry, and a combined data/power interface; and
   an add-on device configured to be coupled to said smartphone combined data/power interface,
   wherein the combined data/power interface comprises:
      one or more data pins for transferring data between the smartphone and the add-on device;
      one or more regulated power delivery pins; and
      one or more protected-battery power delivery pins, and
   wherein said regulated power delivery pins are used to charge the battery of the smartphone from an external charger when coupled to the add-on device, the battery is connected to the battery protection circuitry that is configured to protect the battery by cutting off or limiting the current or voltage on the battery electrodes, the protected-battery power delivery pins are connected to the battery protection circuitry of the smartphone, and the add-on device is powered using a protected-battery power delivery mode by the battery of the smartphone through said protected-battery power delivery pins, and the charging of the battery of the smartphone by the external charger through the one or more regulated power delivery pins and the powering of the add-on device by the smartphone battery through the one or more protected-battery power delivery pins are simultaneously performable,
   whereby the smartphone is chargeable by the external charger when the add-on device is coupled to the smartphone and the external charger is coupled to the add-on device, and whereby when the add-on device is coupled to the smartphone the add-on device is continuously powerable by the smartphone battery whether or not the external charger is coupled to the add-on device.

2. The system of claim 1, wherein the combined data/power interface is USB.

3. The system of claim 1, wherein the combined data/power interface comprises USB type-C connector.

4. The system of claim 1, wherein said one or more protected-battery power delivery pins are usable as data pins or regulated power delivery pins in times they are not used as protected-battery power delivery pins.

5. The system of claim 1, wherein the battery is any one of (1) lithium-ion (Li-ion) battery, (2) lithium-ion polymer (Li-ion polymer) battery, (3) nickel-metal hydride (NiMH) battery, and nickel-cadmium (NiCd) battery.

6. The system of claim 1, wherein the battery is removable and the battery protection circuitry reside inside the removable battery enclosure.

7. The system of claim 1, wherein the battery protection circuitry performs any one of or a combination of (1) cutoff the current between the battery electrodes, (2) limit the current between the battery electrodes, and (3) limit the voltage between the battery electrodes.

8. The system of claim 1, wherein the battery protection circuitry senses any one of or a combination of (1) battery current, (2) battery voltage, and (3) battery temperature.

9. The system of claim 1, wherein the add-on device is any one of (1) storage device, (2) communication device, (3) encryption device, and (4) portable medical imaging device.

10. The system of claim 1, wherein the combined data/power interface further comprises negotiation pins that are used to establish communication between the smartphone and the add-on in order to configure the combined data/power interface.

11. The system of claim 1, wherein the protected-battery power delivery is conditioned upon negotiation between the smartphone and the add-on device.

12. The system of claim 1, wherein the system is configured to couple a plurality of add-on devices by chaining add-on devices one to each other over a chain of combined data/power interfaces.

13. The system of claim 1, wherein the protected-battery power delivery pins are pins that when not used by the combined data/power interface as protected-battery power delivery pins are usable as data pins or regulated power delivery pins.

14. The system of claim 1, wherein some pins of combined data/power interface are configured to be dynamically switched between usage as regulated power delivery pins and usage as protected-battery power delivery pins.

15. The system of claim 1, wherein the smartphone is a modified off-the-shelf smartphone and the modification provides support for protected-battery power delivery mode.

16. The system of claim 1, wherein the smartphone and the add-on device are configured to switch the power delivery mode of one or more pins of combined data/power interface between regulated power delivery and protected-battery power delivery.

17. The system of claim 1, wherein the smartphone and the add-on device are configured to switch the direction of power delivery of one or more pins of combined data/power interface between power flow from the smartphone to the add-on device and power flow from the add-on device to the smartphone.

18. The system of claim 1, wherein the smartphone is running operating system that is any one of (1) Android, (2) iOS, (4) Windows Phones, (5) Windows Mobile, and Chrome OS.

19. The system of claim 1, wherein the smartphone is any one of (1) cellular phone, (2) laptop, (3) tablet, (4) Personal Digital Assistant (PDA), (5) communication terminal, (6) portable media player or (7) portable, battery powered, electronic device.

20. A smartphone powering add-one devices comprising:
   a battery;
   a battery protection circuitry; and
   a combined data/power interface;

wherein the smartphone is configured to be attached to an add-on device using the combined data/power interface, the battery is connected to the battery protection circuitry that is configured to protect the battery by cutting off or limiting the current or voltage on the battery electrodes, the combined data/power interface comprises:
  one or more data pins configured to transferring data between the smartphone and the add-on device;
  one or more regulated power delivery pins; and
  one or more protected-battery power delivery pins, and wherein said regulated power delivery pins are used to charge the battery of the smartphone from an external charger when coupled to the add-on device, and the protected-battery power delivery pins are connected to the battery protection circuitry of the smartphone, and are configured to power the add-on device using a protected-battery power delivery mode by the battery of the smartphone through said protected-battery power delivery pins, and the charging of the battery of the smartphone by the external charger through the one or more regulated power delivery pins and the powering of the add-on device by the smartphone battery through the one or more protected-battery power delivery pins are simultaneously performable, whereby the smartphone is chargeable by the external charger when the add-on device is coupled to the smartphone and the external charger is coupled to the add-on device, and whereby when the add-on device is coupled to the smartphone the add-on device is continuously powerable by the smartphone battery whether or not the external charger is coupled to the add- on device.

21. The smartphone of claim 20, wherein the combined data/power interface is USB.

22. The smartphone of claim 20, wherein the combined data/power interface comprises USB type-C connectors.

23. The smartphone of claim 20, wherein said one or more protected-battery power delivery pins are used as data pins or regulated power delivery pins in times they are not used as protected-battery power delivery pins.

24. The smartphone of claim 20, wherein the battery is any one of (1) lithium-ion (Li-ion) battery, (2) lithium-ion polymer (Li-ion polymer) battery, (3) nickel-metal hydride (NiMH) battery, and nickel-cadmium (NiCd) battery.

25. The smartphone of claim 20, wherein the battery is removable and the battery protection circuitry reside inside the removable battery enclosure.

26. The smartphone of claim 20, wherein the battery protection circuitry performs any one of or a combination of (1) cutoff the current between the battery electrodes, (2) limit the current between the battery electrodes, and (3) limit the voltage between the battery electrodes.

27. The smartphone of claim 20, wherein the battery protection circuitry senses any one of or a combination of (1) battery current, (2) battery voltage, and (3) battery temperature.

28. The smartphone of claim 20, wherein the combined data/power interface further comprises negotiation pins that are used to establish communication between the smartphone and the add-on in order to configure the combined data/power interface.

29. The smartphone of claim 20, wherein the protected-battery power delivery is started conditioned upon negotiation between the smartphone and the add-on device.

30. The smartphone of claim 20, wherein the protection circuitry protected-battery power delivery pins are pins that when not used by the combined data/power interface as protected-battery power delivery pins are used as data pins or regulated power delivery pins.

31. The smartphone of claim 20, wherein some pins of combined data/power interface are configured to be dynamically switched between usage as regulated power delivery pins and usage as protected-battery power delivery pins.

32. The smartphone of claim 20, wherein the smartphone is a modified off-the-shelf smartphone and the modification provides support for using protected-battery power delivery mode.

33. The smartphone of claim 20, wherein the smartphone is able to switch the power delivery mode of one or more pins of combined data/power interface between regulated power delivery and protected-battery power delivery.

34. The smartphone of claim 20, wherein the smartphone and the add-on device are able to switch the direction of power delivery of one or more pins of combined data/power interface between power flow from the smartphone to the add-on device and power flow from the add-on device to the smartphone.

35. The smartphone of claim 20, wherein the smartphone is running operating system that is any one of (1) Android, (2) iOS, (4) Windows Phones, (5) Windows Mobile, and Chrome OS.

36. The smartphone of claim 20, wherein the smartphone is any one of (1) cellular phone, (2) laptop, (3) tablet, (4) Personal Digital Assistant (PDA), (5) communication terminal, (6) portable media player or (7) portable, battery powered, electronic device.

37. A method for modification of an off-the-shelf smartphone
  having a battery, a battery protection circuitry, and a combined data/power interface, wherein the battery is connected to the battery protection circuitry, the combined data/power interface includes a connector, and the connector includes one or more data pins, one or more regulated power delivery pins and one or more newly assigned protected-battery power delivery pins, the method comprising:
  connecting the one or more newly assigned protected-battery power delivery pins to the power port of the battery protection circuitry, thereby enabling charging of the battery of the off-the-shelf smartphone through the one or more regulated power delivery pins by an external charger coupled to an add-on device when the add-on device is coupled to the smartphone and simultaneously enabling powering of the add-on device by the smartphone battery through the one or more protected-battery power delivery pins,
  whereby the smartphone is chargeable by the external charger when the add-on device is coupled to the smartphone and the external charger is coupled to the add-on device, and
  whereby when the add-on device is coupled to the smartphone the add-on device is continuously powerable by the smartphone battery whether or not the external charger is coupled to the add-on device.

38. The method of claim 37, wherein the method is further comprising disconnecting the one or more newly assigned protected-battery power delivery pins from their legacy connection.

39. The method of claim 37, wherein combined data/power interface is USB and the connector of the combined data/power interface is USB Type-C connector.

40. The method of claim 37, wherein said newly assigned protected-battery power delivery pins that after the modification are connected to the battery protection circuitry are one or more out of the eight high speed data transfer pins: A2, A3, A10, A11, B2, B3, B10 and B11 of USB type-C connector.

41. The method of claim 37, wherein said newly assigned protected-battery power delivery pins that after modification are connected to the battery protection circuitry are one or more out of the two side band use pins: A8 and B8 of USB type-C connector.

\* \* \* \* \*